United States Patent
Becker

(10) Patent No.: US 11,409,090 B2
(45) Date of Patent: Aug. 9, 2022

(54) RADIATION COLLECTOR AND METHOD OF MANUFACTURE THEREOF

(71) Applicant: SOLIGHT LTD., Tirat Hacarmel (IL)

(72) Inventor: Ofer Becker, Haifa (IL)

(73) Assignee: SOLIGHT LTD., Ashkelon (IL)

( * ) Notice: Subject to any disclaimer, the term of this patent is extended or adjusted under 35 U.S.C. 154(b) by 122 days.

(21) Appl. No.: 16/620,704

(22) PCT Filed: Jun. 12, 2017

(86) PCT No.: PCT/IL2017/050650
§ 371 (c)(1),
(2) Date: Dec. 9, 2019

(87) PCT Pub. No.: WO2018/229742
PCT Pub. Date: Dec. 20, 2018

(65) Prior Publication Data
US 2020/0174237 A1 Jun. 4, 2020

(51) Int. Cl.
  *G02B 19/00* (2006.01)
  *F21S 11/00* (2006.01)

(52) U.S. Cl.
  CPC ..... *G02B 19/0042* (2013.01); *G02B 19/0019* (2013.01); *G02B 19/0023* (2013.01); *G02B 19/0028* (2013.01); *F21S 11/002* (2013.01)

(58) Field of Classification Search
  CPC ............ G02B 19/0042; G02B 19/0019; G02B 19/0023; G02B 19/0028; F21S 11/002
  See application file for complete search history.

(56) References Cited

U.S. PATENT DOCUMENTS 3,923,381 A * 12/1975 Winston ............... F24S 23/00
                                                              359/852
4,003,638 A    1/1977 Winston
                            (Continued)

FOREIGN PATENT DOCUMENTS

CN        1729417 A      2/2006
CN      101375112 A      2/2009
                            (Continued)

OTHER PUBLICATIONS

International Search Report from International Application No. PCT/IL2017/050650 dated Sep. 26, 2017.
(Continued)

*Primary Examiner* — Arman B Fallahkhair
(74) *Attorney, Agent, or Firm* — Dorsey & Whitney LLP

(57) ABSTRACT

Non-imaging radiation collecting and concentrating devices, and assemblies, are disclosed. The non-imaging radiation collecting and concentrating devices comprise an entrance aperture for receiving incoming radiation, an exit aperture located opposite to the entrance aperture for outputting concentrated radiation, and one or more concaved reflectors arranged between the entrance and exit apertures. The concaved reflectors define an acceptance angle of the device relative to an optical axis thereof and configured such that their optical focuses are located between edges of the exit aperture and the optical axis, thereby substantially preventing escape of the incoming radiation received in the entrance aperture within the acceptance angle and providing substantial uniform radiation collection at the exit aperture of the device.

21 Claims, 16 Drawing Sheets

(56) References Cited

U.S. PATENT DOCUMENTS

| | | | |
|---|---|---|---|
| 4,815,444 A | 3/1989 | Holland | |
| 4,922,107 A * | 5/1990 | Rabi | G02B 19/009 250/504 R |
| 5,255,171 A | 10/1993 | Clark | |
| 5,699,201 A * | 12/1997 | Lee | G02B 19/0028 359/708 |
| 5,971,551 A * | 10/1999 | Winston | F24S 23/00 359/868 |
| 6,123,436 A | 9/2000 | Hough et al. | |
| 6,986,591 B2 | 1/2006 | Pate | |
| 7,068,446 B2 * | 6/2006 | Jacobson | G02B 19/009 359/726 |
| 7,081,584 B2 * | 7/2006 | Mook | H01L 31/052 126/683 |
| 7,688,525 B2 | 3/2010 | Hines et al. | |
| 8,058,546 B1 | 11/2011 | Casperson | |
| 8,184,372 B1 | 5/2012 | Gu | |
| 8,546,686 B2 * | 10/2013 | Ashkin | G02B 19/008 136/259 |
| 8,864,343 B2 | 10/2014 | Inoue | |
| 9,000,293 B2 * | 4/2015 | Caparros Jimenez | G02B 19/0042 136/259 |
| 9,194,378 B2 * | 11/2015 | Sayer | F24S 80/60 |
| 9,893,223 B2 * | 2/2018 | Moran | H01L 31/0547 |
| 9,917,221 B2 * | 3/2018 | Boriskina | H01L 31/04 |
| 10,024,577 B2 * | 7/2018 | Becker | C03C 4/08 |
| 10,132,457 B2 * | 11/2018 | Farkas | A01G 7/04 |
| 10,133,044 B2 * | 11/2018 | Amjad | F24S 25/60 |
| 10,288,323 B2 * | 5/2019 | Liu | F24S 70/10 |
| 11,049,984 B2 * | 6/2021 | Becker | G02B 19/0019 |
| 2001/0006066 A1 | 7/2001 | Cherney et al. | |
| 2006/0072222 A1 | 4/2006 | Lichy | |
| 2011/0193512 A1 | 8/2011 | Singhal et al. | |
| 2016/0327228 A1 | 11/2016 | Farkas et al. | |

FOREIGN PATENT DOCUMENTS

| | | |
|---|---|---|
| CN | 201594157 U | 9/2010 |
| CN | 103941383 A | 7/2014 |
| CN | 105978478 A | 9/2016 |
| CN | 106062612 A | 10/2016 |
| WO | 2007026311 A1 | 3/2007 |
| WO | 2010101644 A1 | 9/2010 |
| WO | 2010107921 A1 | 9/2010 |
| WO | 2014106816 A2 | 7/2014 |
| WO | 2016005964 A1 | 1/2016 |
| WO | 2017122193 A1 | 7/2017 |

OTHER PUBLICATIONS

Oberauer, et al., "Light concentrators for Borexino and CTF", Science Direct, Nuclear Instruments and Methods in Physics Research, Section A, vol. 530, No. 3, Sep. 11, 2004, pp. 453-462.

Radu, et al., "Design studies for nonimaging light concentrators to be used in very high-energy gamma-ray astronomy", Nuclear Instruments and Methods in Physics Research, Section A, vol. 446, No. 3, May 1, 2000, pp. 497-505.

Winston, et al., "Principles of solar concentrators of a novel design", Solar Energy, Pergamon Press, vol. 16, No. 2, Oct. 1, 1974, pp. 89-95.

* cited by examiner

Source Angle

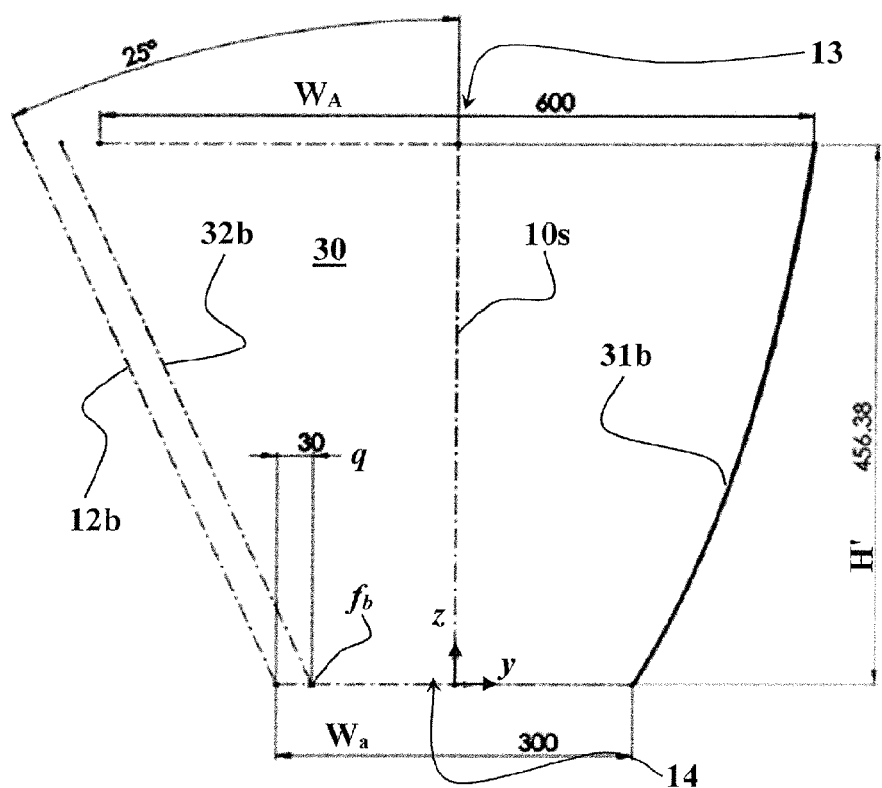
Fig. 7A
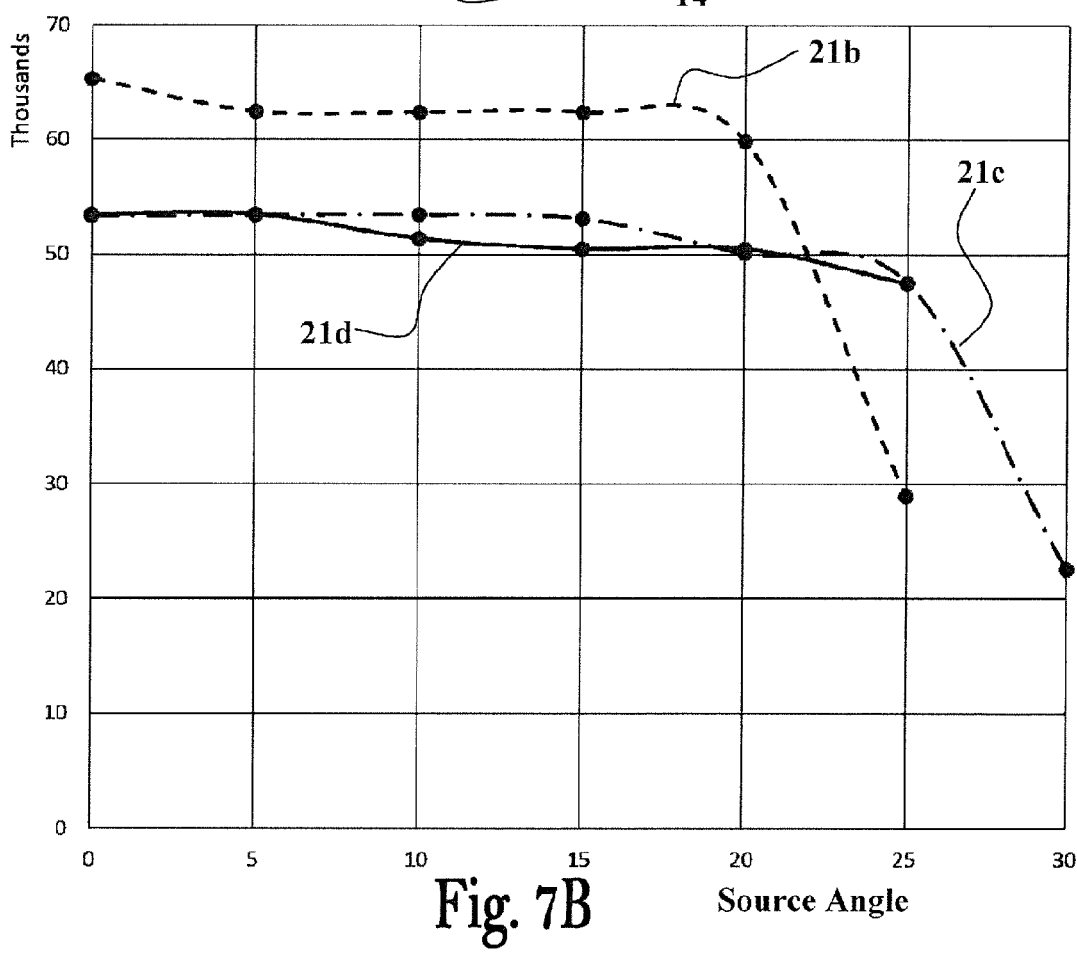
Fig. 7B  Source Angle

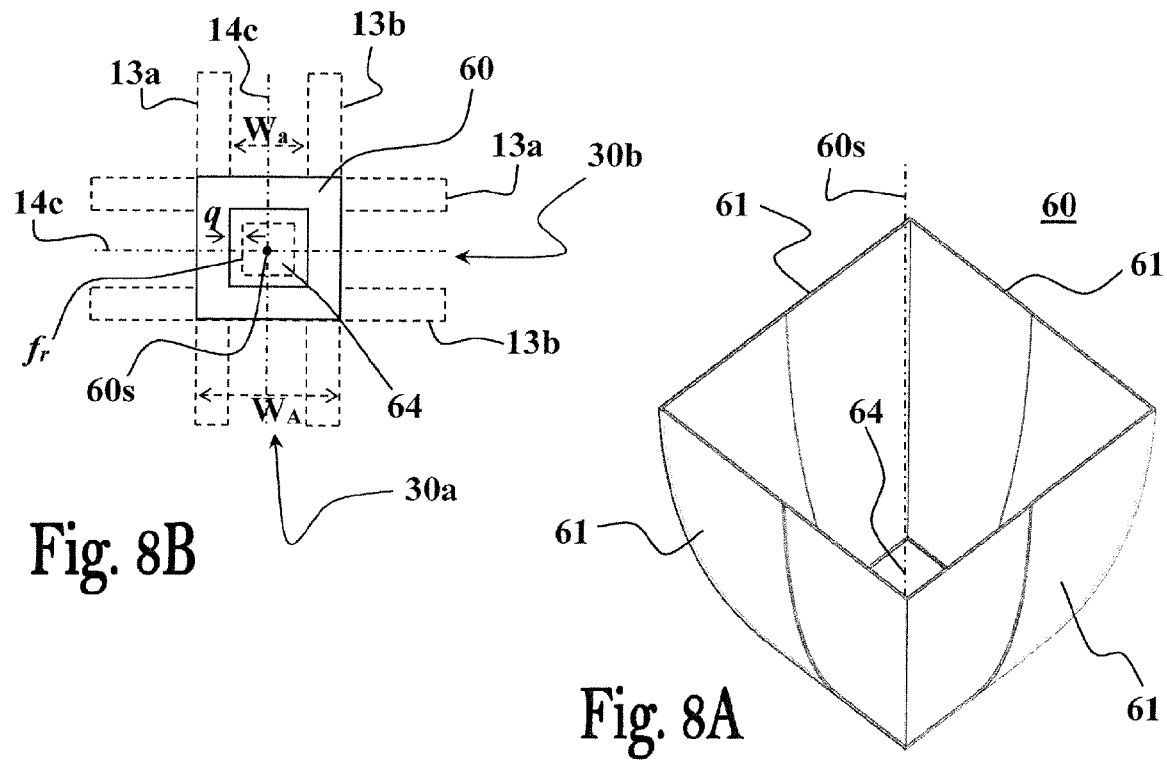
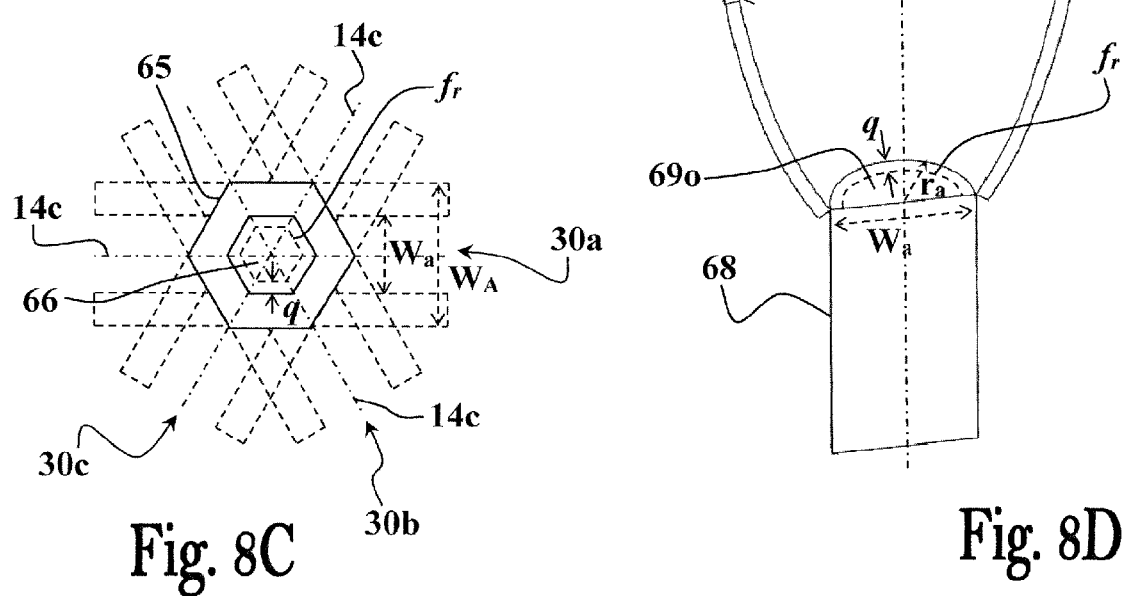

RADIATION COLLECTOR AND METHOD OF MANUFACTURE THEREOF

TECHNOLOGICAL FIELD

The present application is generally in the field of non-imaging optics. More particularly, the present application relates to novel non-imaging radiation concentrator designs and to radiation collector devices constructed based thereon.

BACKGROUND

Non-imaging optics relates to applications that do not require image formation (i.e., no need to concentrate the collected rays to a single point), but rather efficient collection and concentration of electromagnetic radiation (e.g., solar energy conversion, signal detection, illumination optics, and suchlike). Major work in the field of non-imaging optics was pioneered by Roland Winston, and other researchers from the Chicago University, who invented the compound parabolic concentrator (CPC).

CPC devices are concentrating non-imaging radiation collectors employing reflective parabolic surfaces designed to concentrate light rays that are not necessarily parallel/aligned with the axis of the device. Typically, a CPC concentrator device is designed to receive direct and diffused incident radiation entering its entrance aperture (also referred to as input aperture) with large angular spread, and concentrate it through an exit aperture of the device (also referred to as output aperture) onto a target surface of relatively small area. More recent work in the field of non-imaging optics is attributed to Daniel Feuermann and Jeffrey Gordon from the Ben-Gurion University.

Some non-imaging optic systems using CPC devices known from the patent literature are briefly discussed below.

U.S. Pat. Nos. 3,923,381 and 4,003,638 describe non-imaging systems and devices for collection and concentration of electromagnetic energy and particularly solar energy including one or more longitudinally-extending, generally trough-shaped bodies having curving inner reflective walls for concentration of energy from a relatively large entrance aperture toward a relatively small exit aperture. The disclosed solar energy concentrators include energy traps for collection and concentration of substantial amounts of direct solar energy, even at solstice, without substantial diurnal tracking.

U.S. Pat. No. 6,123,436 suggests using a CPC as a deconcentrator having an input aperture positioned near a point of minimum focus of a reflector, an output aperture which is larger than the input aperture, and a reflective inner surface that connects the two apertures. The general shape of the reflecting optic's inner surface may be parabolic, elliptical, hyperbolic, circular, conical, or combinations of these shapes.

U.S. Pat. No. 8,864,343 describes a light emitting device comprising a CPC lens having a light receiving surface, a side reflective surface, and a light emitting surface. The light receiving surface receives a part of light from the surface light source, the side reflective surface reflects the light from the light receiving surface, and the light emitting surface faces the light receiving surface and emits the light.

GENERAL DESCRIPTION

CPC design is a well-established field in concentrated photo voltaic (CPV), and thermal solar (TS), systems. In both applications, however, maximal CPC efficiency is the main design consideration, as the collected energy is typically stored (e.g., thermally) or converted and transferred (e.g., to the electric grid). Thus, conventional CPC design schemes (also referred to herein as classical CPC designs or devices) used nowadays concentrate mainly on maximizing the energy collection throughout a trajectory (path) of a celestial radiating source (e.g., the sun), while neglecting uniformity of radiation collection considerations.

The present disclosure provides radiation collector, such as CPC, design schemes optimized for uniform collection of radiation emitted from a moving radiation source. The radiation collector design schemes described herein are particularly, but not exclusively, beneficial in applications wherein the collected radiation energy is not converted (e.g., as in CPV applications), but rather directed for use for lighting, and therefore requiring substantial uniform radiation collection performance/profile across the acceptance angle of the collector.

The inventors of the present invention devised novel radiation collector designs, such as CPCs, for non-imaging applications, that provide substantial uniform radiation collection profiles at any suitable concentration and with minimal overall performance costs. It is thus appreciated that the radiation collector designs described herein are optimal for solar lighting applications (e.g., static solar lighting systems) that require provision of substantially uniform radiation collection profile throughout a route of a moving celestial radiation source. For this, and other, purposes novel radiation collecting devices were designed to utilize reflective curved/concaved surfaces (e.g., using parabolic reflectors, circular reflectors, dish-shaped reflectors, elliptical reflectors, hyperbolic reflectors, spherical reflector, or any combination thereof) arranged in a manner capable of providing uniform radiation collection throughout angular spans of the devices.

In some embodiments a radiation collection device is provided having entrance and exit apertures, and concaved reflectors extending therebetween and defining an optical axis of the device passing between centers of the apertures, wherein the optical focuses of the concaved reflectors are obtained at the exit aperture side of the device between edges of the exit aperture and the optical axis of the device, thereby minimizing flux losses occurring due to ray divergence near the angular spans edges, and during seasonal extremities. In this way, a substantially uniform radiation collection profile is obtained throughout angular span of the device, at the cost of somewhat reduced total flux/radiation collection.

The term curved/concaved reflector or reflecting surface, as used herein generally refers to radiation (light) reflecting elements configured to reflect and concentrate incident radiation onto a focal region (e.g., point, line, plane or volume), such as, but not limited to, parabolic reflectors, circular reflectors, dish-shaped reflectors, elliptical reflectors, hyperbolic reflectors, spherical reflector, or any combination thereof. It is also noted that the terms parabolic reflector, circular reflector, elliptical reflector, hyperbolic reflector, or spherical reflector, generally meant to refer to curved/concaved reflector elements having reflecting surfaces that are a part of a parabola, a circle, an ellipse, a hyperbola, or a sphere, respectively, or some approximation thereof.

In some embodiments modified CPC devices are provided having reflective parabolic surfaces (also referred to herein as parabolic reflectors) configured to provide uniform radiation collection profile with minimal reduction in the total flux collection throughout an angular span thereof, and with minimal change/increase of the dimensions' of the modified CPC device i.e., compared to conventional/classical CPC devices having the same exit aperture dimensions (and/or apertures ratio) and the same acceptance angle.

In some embodiments, the heights of the modified CPC devices disclosed herein are truncated to about a half of the full-height of a classical CPC device having the same exit aperture and the same acceptance angle. In this configuration, a total reduction of radiation collection of about 7% is obtained with the truncated CPC device, relative to the total radiation collection of a non-truncated CPC device having the same exit aperture and the same acceptance angle. Alternatively, in some embodiments the heights of the modified CPC devices disclosed herein are reduced, as compared to the classical CPC device having the same exit aperture and the same acceptance angle, by adjusting the heights of their reflectors such that their reflective surfaces are parallel to the optical axis of the device at the entrance aperture.

In a possible application, a modified two-dimensional (trough-shaped) CPC device is constructed by a pair of elongated parallel parabolic reflectors symmetrically positioned one in front of the other such that the distance between the surfaces of the parabolic reflectors is progressively reduced towards the exit aperture, thereby forming a tapering profile of the device. The axis of symmetry of the parabolic reflectors defines an optical axis of the device, and the angle between the optical axis of the device and the parabolic axis of the reflectors defines an acceptance angle of the device. The distance between the lower edges of the parabolic reflectors defines a width ($W_a$) of the elongated exit aperture of the device and the distance between the upper edges of the reflectors defines a width ($W_A$) of the elongated entrance aperture of the device.

The modified two-dimensional CPC device is configured such that parabolic focus (also referred to herein as optical focus) of each of its parabolic reflectors focus incoming incident radiation received at the entrance aperture at angles within its acceptance range (i.e., at angles smaller than, or equal to, the acceptance angle of the device) to a focal line/region residing at the exit aperture side (within the exit aperture, or slightly above or below it) between an opposite edge of the exit aperture (relative to the respective parabolic reflector) and the optical axis of the device.

Optionally, and in some embodiments preferably, the parabolic focus of each parabolic reflector of the modified two-dimensional CPC device resides at a distance of up to 0.27 of the width of the elongated exit aperture (i.e., up to $0.27 \cdot W_a$) from the opposite edge of the exit aperture, optionally about two tenths of the width of the elongated exit aperture (i.e., $0.2 \cdot W_a$). In some embodiments the focal region of the parabolic reflectors substantially falls on (and/or within) two substantially parallel lines at the exit aperture (or slightly above or below it) extending along and parallel to the long axis of the exit aperture.

In other possible embodiments modified three-dimensional CPC devices having polygon sectional shape are constructed as an intersection of two or more of the modified two-dimensional (trough-shaped) CPC devices, thereby obtaining a polygonal funnel-shaped CPC device having a polygon sectional shape configured to focus incoming radiation received at its entrance aperture at angles within the acceptance ranges of the intersectioned modified two-dimensional CPC devices to a polygonal region at the exit aperture side (within the exit aperture, or slightly below or above it). Optionally, and in some embodiments preferably, the optical focuses of the reflectors falls on regions that are translated towards the axes of symmetry of the modified intersectioned two-dimensional CPC devices. The focal region in this case falls on (and/or within) the sides/lines of a polygonal region residing at the exit aperture side (within the exit aperture, or slightly below or above it) that is smaller in dimensions than, and substantially concentric with, the exit aperture of the modified three-dimensional CPC device.

For example, and without being limiting, the modified three-dimensional CPC device can be comprised of two modified two-dimensional trough-shaped CPC devices, where the two parallel parabolic reflectors of one of the modified two-dimensional CPC devices are symmetrically positioned at the lateral sides of the other trough-shaped CPC device. This configuration provides a funnel-shaped CPC device having a rectangular sectional shape configured to focus incoming incident radiation received at its entrance aperture at angles within the acceptance ranges of the modified two-dimensional CPC devices to a region of the exit aperture (or slightly below or above it) which sides are translated towards the axes of symmetry of the modified two-dimensional CPC devices. The focal regions in this case may fall on the sides/lines of a rectangular region residing at the exit aperture side (within the exit aperture, or slightly below or above it) that is smaller in dimensions than, and substantially concentric with, the exit aperture of the modified three-dimensional CPC device.

Optionally, and in some embodiments preferably, the parabolic focus of each parabolic reflector of the modified three-dimensional CPC device resides between an opposite edge of the exit aperture and a focal axis of the device. In some embodiments, the parabolic focus of each parabolic reflector of the modified three-dimensional CPC device resides at a distance from the opposite edge of the exit aperture of about 0.05 to 0.27 of the width of the elongated exit aperture of the two-dimensional CPC devices from which the modified three-dimensional devise is constructed (i.e., $0.05 \cdot W_a$ to $0.27 \cdot W_a$), optionally about two tenths of the width of the elongated exit aperture (i.e., $0.2 \cdot W_a$).

Similarly, modified three-dimensional CPC devices can be constructed by intersection of three, four, five, six, or more, modified two-dimensional CPC devices, for which focal regions of polygonal shapes having 8, 10, 12, or more sides, are respectively obtained, that are concentric with the exit aperture of the device i.e., the focal regions of the reflectors substantially fall on (and/or resides within) a polygonal shape having 8, 10, 12, or more sides, respectively.

Alternatively, a modified three-dimensional CPC device is constructed as surface revolution of a parabolic curve about an optical axis of the device, thereby obtaining a skirt-shaped modified CPC device configured to focus incoming radiation received at its entrance aperture at angles within its acceptance range to a region of the exit aperture side (within the exit aperture, or slightly below or above it) e.g., translated towards the optical axis of the device. Thus, in this configuration the upper opening of the modified three-dimensional CPC device defines a circular entrance aperture having a radius $R_A$, and its lower opening defines a circular exit aperture having a smaller radius $R_a$. The focus region in this case substantially falls on (and/or within) a circle that is concentric with the exit aperture and having a radius smaller than the radius $R_a$ of the exit aperture, and that substantially resides in (or slightly above or below) the exit aperture. Optionally, and in some embodiments preferably, the diameter of the circle of the focal region is about 0.05 to 0.27 smaller than the diameter ($D_a = 2 \cdot R_a$) of the exit aperture (i.e., $0.05 \cdot D_a$ to $0.27 \cdot D_a$), optionally about two tenths of the diameter of the exit aperture (i.e., $0.2 \cdot D_a$).

Optionally, the heights of the reflectors of the modified CPC devices disclosed herein are shortened to reduce the geometrical dimensions of the modified two- and three-dimensional CPC devices e.g., about half of the height of reflectors in the classical CPC design.

As will described hereinbelow, various tests and simulations conducted by the inventors of the present invention show that the modified (two-, and three-, dimensional) CPC configurations of the invention in which the focal regions/lines of the parabolic reflectors are translated a distance of about two tenths of the width of the exit aperture towards the optical axis of the device, appear to provide optimal results in terms of uniform radiation collection, total flux collection, and modified dimensions of the device.

The present application further relates to collector assemblies comprising an array of radiation collectors configured to form an equilateral radiation collection front, efficiently transferring the concentrated light outputted from the array of radiation collectors towards an equilateral output opening. This collector assembly configuration permits an efficient interface to radiation guiding elements having a circular cross-sectional shape, as commonly used in solar applications. In some embodiments the array of radiation collectors comprises a plurality of elongated radiation collectors, such as described hereinabove and hereinbelow, arranged side by side one parallel to the other to form a substantially square radiation collection front of the assembly.

The array of radiation collectors can be tilted relative to ground surface to substantially face a celestial radiation source. A radiation guiding structure having a substantially equilateral/square and tilted opening can be used to receive the concentrated light outputted from the array of radiation collectors and direct the received concentrated light toward a smaller substantially equilateral/square and horizontal opening thereof. The radiation guiding structure comprises in some embodiments a minor anterior (relative to the radiation source) reflector having a substantially flat or slightly curved/arced shape, and a major (i.e., of larger dimensions) posterior reflector having a substantially curved/arced shape facing the output opening of the radiation collectors of the array.

One inventive aspect of the subject matter disclosed herein relates to a non-imaging radiation collecting and concentrating device comprising an entrance aperture for receiving incoming radiation, an exit aperture located opposite to the entrance aperture for outputting concentrated radiation, and one or more concaved reflectors located between the entrance and exit apertures. The concaved reflectors are configured to define an acceptance angle of the device relative to an optical axis thereof passing between centers of the apertures. The concaved reflectors are configured such that their optical focuses are located between edges of the exit aperture and the optical axis, to thereby substantially prevent escape of the incoming incident radiation received in the entrance aperture within the acceptance angle and provide substantial uniform radiation collection at the exit aperture of the device.

Optionally, and in some embodiments preferably, the concaved reflectors are configured such that the optical focus of each reflector is located either within a region defined by the exit aperture, or above or below it. Preferably, the distance between the optical focus of each concaved reflector and an edge of the exit aperture is such that the incident radiation concentrated by said concaved reflector is focused to the exit aperture, without hitting another concaved reflector of the device (opposite to/facing the concaved reflector).

In comparison to classical CPC designs, the optical focuses of the concaved reflectors are shifted at the exit aperture side of the device inwardly towards the CPC plane/axis of symmetry, where the shift size (distance from an edge of the exit aperture) may vary from one implementation to another according to design considerations. For example, and without being limiting, in some embodiments a distance between the optical focus of each concaved reflector and an opposite edge of the exit aperture of the device is up to 0.27 of a dimension/size (e.g., width) of the exit aperture, optionally about two tenths of a dimension (e.g., width) of the exit aperture.

In some embodiments height of the device is reduced to about 0.5 of a height of a classical CPC device having similar/about the same acceptance angle and similar/about the same entrance and exit apertures dimensions. In other possible embodiments, the height of the device is adjusted in order to set dimension/size of the entrance aperture for obtaining a predefined concentration ratio of the radiation collection device. It is noted that principles of the present invention may be used to design radiation collection and concentration devices having any suitable acceptance angles and concentration ratios. It is however understood that setting the acceptance angle of the radiation collection device in the range of 20° to 30° is preferable in applications wherein solar radiation is to be collected by the device. In such applications a concentration ratio of the device is optionally in the range of 2 to 3 (inclusive). It is now understood that for concentration ratios of about 2 the optical focus of the parabolic reflector of the radiation collection device can be shifted a distance from the edge of the exit aperture of up to 0.27 of the width/size of the exit aperture (i.e., up to $0.27 \cdot W_a$), within this limit the height of the device can be adjusted for setting the size of the entrance aperture to obtain the needed concentration.

Optionally, and in some embodiments preferably, the device comprises two concaved reflectors symmetrically positioned one in front of the other. In some applications, a radiation collecting and concentrating device having a polygon funnel-shaped structure is constructed by intersection of two or more of the devices comprising the two symmetrically positioned concaved reflectors.

In some embodiments, the concaved reflector is constructed as a surface revolution of a concaved curve about the optical axis of the device.

Another inventive aspect of the subject matter disclosed herein relates to a lighting system comprising an array of radiation collectors arranged for collection of radiation of a celestial radiation source throughout a predefined trajectory thereof. Preferably, the array of radiation collectors comprises one or more of the radiation collecting and concentrating devices described hereinabove and hereinbelow. For example, and without being limiting, the radiation collecting and concentrating devices described hereinabove and hereinbelow may be used in the lighting, and light collecting, systems described in international patent publication No. WO 2014/106816 and in international patent application No. PCT/IL2014/050618, of the same applicant hereof, and which are incorporated herein by reference.

Another inventive aspect of the subject matter disclosed herein relates to a method of constructing a radiation collector. The method comprising providing one or more concaved reflectors, each concaved reflector configured to reflect and concentrate incident radiation onto a focal region thereof, arranging the concaved reflectors to define an entrance aperture for receiving incident radiation, an exit aperture for outputting radiation reflected and concentrated by said reflectors, and an optical axis extending along centers of the apertures, such that the focal region of each concaved reflector is obtained between an edge of the exit aperture and the optical axis.

Optionally, and in some embodiments preferably, the method comprises adjusting heights of at least some of the concaved reflectors for setting dimension/size of the entrance aperture to obtain a needed concentration ratio of the device. In some applications the concaved reflectors are parabolic reflectors configured to define an acceptance angle of the incident radiation, and the method comprises truncating the height of at least some of the reflectors to half of the height of a classical CPC device having similar/about the same acceptance angle and similar/about the same exit aperture dimension/size.

In some embodiments the method comprises configuring the reflectors to locate their focal regions at a distance from an edge of the exit aperture such that the radiation concentrated by said concave reflector is focused to the exit aperture without hitting another concaved reflector of the device. Optionally, concentration ratio of the radiation collector is about 2 and the method comprising configuring the reflectors to locate their focal regions at a distance from an edge of the exit aperture of up to 0.27 of a dimension of the exit aperture. This is achieved in some embodiments by adjusting the curvature of the reflectors e.g., to change their concave depth, while substantially maintaining desired dimensions of the exit and entrance apertures of the device.

For example, when the concaved reflectors are implemented by parabolic reflectors, the configuring of the reflectors comprises adjusting at least one of a parabolic focus, parabolic directrix, and parabolic vertex, of said parabolic reflectors. In this way, the optical focuses of the reflectors can be shifted towards the optical axis/plane of the device while leaving the dimensions of the entrance and exit apertures of the device substantially unchanged, or only slightly altered. However, as described hereinabove and hereinbelow, the adjusting of the curvature of the reflectors may require also adjusting their heights for setting size of the entrance aperture to obtain a needed concentration ratio. Accordingly, in some embodiment configuring the reflectors comprises adjusting a concave depth of the at least some of the reflectors.

Optionally, and in some embodiments preferably, the radiation collector is used to collect solar radiation. In this case, the method may comprise configuring at least some of the reflectors to: define acceptance angle of the device of about 20° to 30°, and/or obtain a concentration ratio of about 2 to 3.

A yet another inventive aspect of the subject matter disclosed herein relates to a method of modifying a non-imaging radiation collecting and concentrating device having one or more radiation reflecting elements arrange about an optical axis of the device to define entrance and exit apertures thereof, the method comprising adjusting a concave depth of the radiation reflecting elements such that optical focuses thereof are shifted a predefined distance from edges of the exit aperture towards the optical axis of the device, to thereby prevent escape of incoming radiation received at the entrance aperture and provide a substantial uniform radiation collection profile.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 2A and 2B present a classical (full-height) CPC design having 25° acceptance angle and exit aperture of 300 mm, and simulations thereof, wherein FIG. 2A is a schematic illustration of the CPC device and FIG. 2B is a plot showing flux/radiation collection obtained in simulations of the CPC device of FIG. 2A for solar and point radiation sources;

FIGS. 3A and 3B show the classical CPC design of FIG. 2A implemented using truncated parabolic reflectors, wherein FIG. 3A shows a schematic illustration of the truncated CPC device and FIG. 3B shows flux collection plots obtained in simulations of the full-height classical CPC device of FIG. 2A and of the truncated CPC device of FIG. 3A, with solar radiation sources;

FIGS. 5A and 5B present a simulation of a (full-height) classical CPC design having 30° acceptance angle and concentration ratio of 2, wherein FIG. 5A is a schematic illustration of the CPC device and FIG. 5B shows flux collection plots obtained in solar radiation source simulations of the CPC devices of FIGS. 2A and 5A;

FIGS. 7A and 7B present simulation of a truncated modified CPC design according to possible embodiments having 25° acceptance angle and concentration ratio of 2, wherein FIG. 7A is a schematic illustration of the truncated modified CPC device and FIG. 7B shows flux collection plots obtained in solar radiation source simulations of the CPC devices of FIGS. 2A, 5A and 7A;

FIGS. 8A to 8D schematically illustrate modified three-dimensional CPC designs according to some possible embodiments, wherein FIGS. 8A and 8B respectively show perspective and top views of a three-dimensional CPC device having a rectangular funnel shape, FIG. 8C shows a top view of a three-dimensional CPC device having a hexagonal funnel shape, and FIG. 8D shows a skirt-shaped three-dimensional CPC device;

FIGS. 10A to 10C show simulation results of performance of various CPC designs disclosed herein as obtained for large ray divergence conditions (e.g., "cloudy" conditions), wherein FIG. 10A is a ray tracing diagram obtained for a truncated modified CPC device with the large ray divergence conditions, FIG. 10B is a ray tracing diagram obtained for a full-height non-modified CPC device having a 30° acceptance angle, with the large ray divergence conditions, and FIG. 10C shows plots of flux collection obtained in the simulations with 60° half angle radiation source;

FIGS. 11A and 11B show comparison results between a full-height classical CPC design and a truncated modified CPC design, according to some possible embodiments, having about the same exit apertures and about the same acceptance angles, simulated with a solar radiation source, wherein FIG. 11A is a schematic illustration of the CPC devices used in the simulations and FIG. 11B show flux collection plots of solar radiation source simulations; and FIGS. 12A to 12 D show assemblies of radiation collectors array configured in some embodiments to form an equilateral radiation collection front, wherein FIG. 12A is a sectional side view of a radiation collection assembly comprising an array of radiation collectors, and FIGS. 12B, 12C, and 12D, respectively show side-sectional, top perspective, and bottom perspective, views of a radiation collection assembly comprising an array of radiation collectors having additional internal light reflectors.

DETAILED DESCRIPTION OF EMBODIMENTS

Figures 1A, 1B:
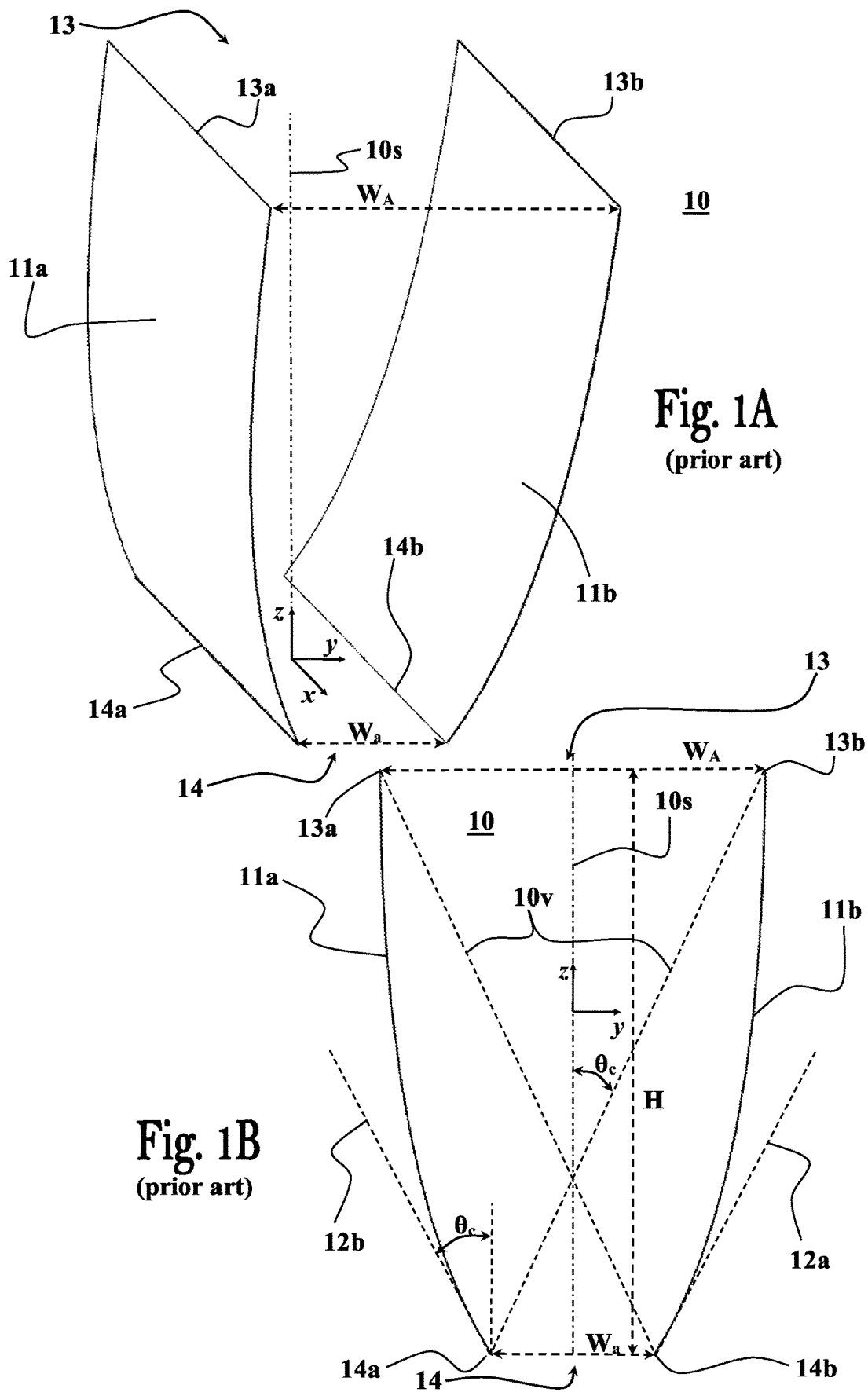
FIGS. 1A and 1B schematically illustrate perspective and front views, respectively, of a classical two-dimensional CPC device.

One or more specific embodiments of the present application will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. Though dimensions are indicated for some elements in the figures, these dimensions are provided by way of example only, and the invention is of course not limited to these specific examples. This invention may be provided in other specific forms and embodiments without departing from the essential characteristics described herein.

The present invention provides novel stationary radiation collection device configurations designed to provide substantially uniform radiation collection within a predetermined angular span of the device and throughout a trajectory of a moving radiation source. The classical CPC designs commonly used nowadays in non-imaging applications are optimized to maximize collection of diffused and direct radiation emitted from a moving celestial source and concentrate it onto an area of minimum size. During experimentation and simulation of such classical CPC designs, using a realistic finite sized Solar Source, the inventors hereof surprisingly realized that these designs are not capable of providing uniform collection of radiation across the angular span of the device, particularly due to abrupt collection drop occurring at edge regions of their acceptance ranges. For these and other reasons it was understood that the classical CPC designs are not suitable for lighting applications, which initiated further research and experimentations in attempt to resolve these deficiencies.

Although the following disclosure relates to radiation collection techniques and devices employing parabolic reflectors/surfaces, and particularly to modified CPC designs, it should be understood that the invention is not limited to such parabolic reflectors/surfaces and CPC designs, and that other types of curved/concaved reflectors/surfaces may be similarly used to provide radiation collecting devices providing substantially uniform radiation collection profiles, using the techniques and configurations described hereinabove and hereinbelow.

A short discussion about the classical CPC designs exemplified in FIGS. 1A and 1B will be appropriate for better understanding of the CPC devices typically used nowadays in non-imaging applications. The classical CPC device 10 shown in FIG. 1A consists of two elongated parallel parabolic reflectors, 11a and 11b, symmetrically positioned (about the xz plane) one in front of the other with their reflective surfaces facing each other. The distance $W_A$ between the upper edges, 13a and 13b, of the parabolic reflectors, 11a and 11b, defines the width of the elongated entrance aperture 13 of the device 10, and the distance $W_a$ between their lower edges, 14a and 14b, defines the width of the elongated exit aperture 14 of the device. The distance between the surfaces of the parabolic reflectors 11a and 11b is progressively reduced towards the exit aperture 14 forming a tapering profile of the device.

In classical CPC designs 10, in order to maximize the total radiation collection of the device, the parabolic focus of the parabolic reflectors must pass through the opposite edges of the exit aperture 14, and the parabola axis of each parabolic reflector must be tilted at an angle $\theta_c$ with respect the optical axis 10s of the device, that is equal to the half angle of the angular span of the device, within which incident radiation received at the entrance aperture 13 cannot escape out of the device 10. Particularly, as shown in FIG. 1B, the parabola axis 12b of the parabolic reflector 11b passes through the lower edge 14a of the parabolic reflector 11a, thereby defining the focal point/line of the parabolic reflector 11b at the opposite edge 14a of the exit aperture 14. Similarly, the parabola axis 12a of the parabolic reflector 11a passes through the lower edge 14b of the parabolic reflector 11b, thereby defining the focal point/line of the parabolic reflector 11a at the opposite edge 14b of the exit aperture 14.

The angle $\theta_c$ between each of the parabola axes 12a and 12b of the parabolic reflectors and the optical axis 10s of the device equals to half of the angle defined between the lines 10v bounding the incident radiation, and defines the acceptance angle of the CPC device 10. The concentration value of the CPC device 10 is defined by the ratio between the widths of the entrance and exit apertures ($W_A/W_a$). It is noted that though the classical CPC device 10 as a three-dimensional structure, it is sometimes referred to as a two-dimensional CPC since it is constructed from two symmetrically positioned parabolic reflectors. The height H of the classical CPC device (also referred to herein as full-height) is typically determined by the following equation:

$$H = 0.5 \cdot W_a \cdot \cot\theta_c \cdot (1 + 1/\sin\theta_c). \quad (1)$$

Such classical CPC devices are generally oriented in East-West direction for allowing effective collection of solar radiation throughout the day-time trajectory of the sun in the sky.

Figure 2A:
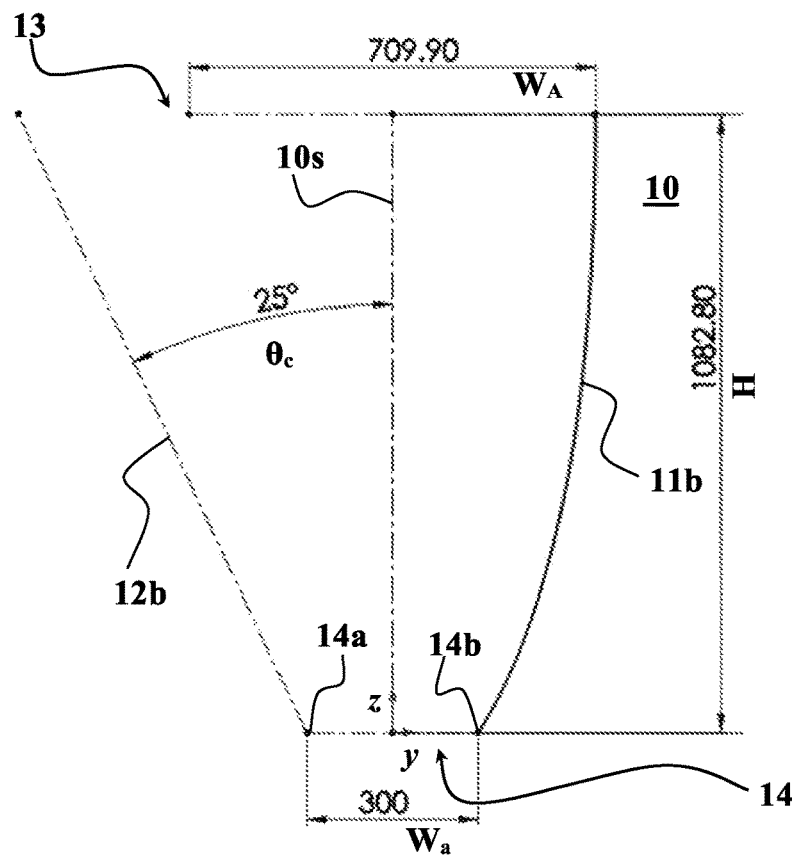
Figure 2B:
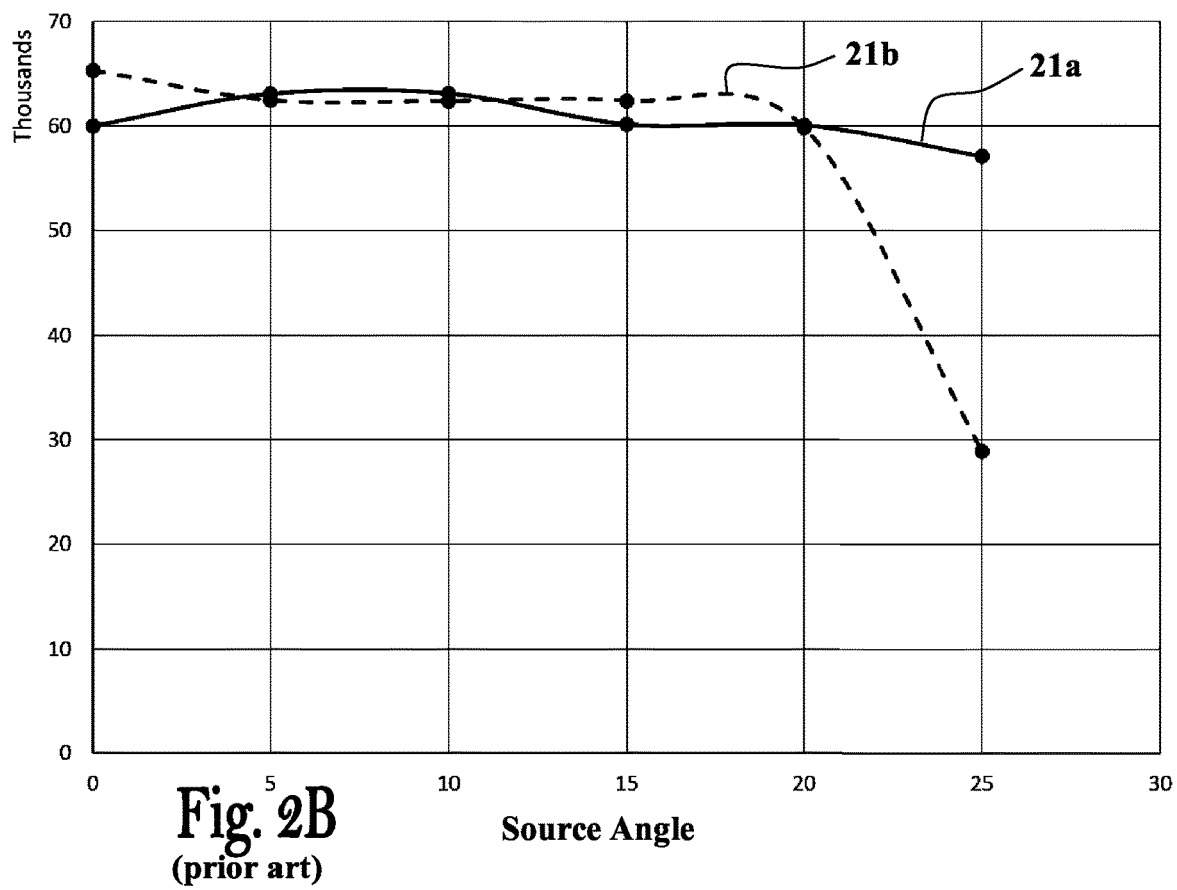

FIGS. 2A and 2B present simulations of the classical CPC collector device 10 shown in FIG. 2A, having a 25° acceptance angle ($\theta_c$) and a concentration ratio of 709.9/300=2.36. The height H of the CPC device 10 simulated in this non-limiting example is the full-height of classical CPC design obtained by equation (1), 1082.80 mm. The graphical plots in FIG. 2B show flux collection vs radiation source angle as obtained in simulations of the classical CPC device 10 of FIG. 2A, for a solar radiation source (plot 21b) and a point radiation source (plot 21a). Surprisingly, the plot 21b evaluating the performance of the classical CPC collector 10 with a solar radiation source shows a noticeable decline (of about 30%) towards the end of the theoretical acceptance angle. As also seen in FIG. 2B, the plot 21a obtained in the evaluation of the classical CPC collector 10 with the theoretical point source does not display this phenomenon. However, as the simulated solar source represents the sun more accurately, taking into account its finite size in the sky of 32 minutes of arc (0.5334°), the flux collection plot 21b obtained for a solar radiation source is more realistic and relevant to non-imaging applications requiring uniform radiation collection profiles. Particularly, in the solar source simulation (plot 21b) the solar source rays are slightly diverging, compared to the fully collimated rays simulated with the point source (plot 21a), and this difference accounts for the performance loss seen in FIG. 2B.

It is noted that although the plots shown in FIG. 2B were obtained for two-dimensional prismatic CPCs, the same principles are evenly applicable for three-dimensional CPC configurations e.g., having cylindrical symmetry or polygon funnel-shape.

Optionally, and in some embodiments preferably, the height of the parabolic reflectors of the CPC device are reduced to about half of the full-height given by equation (1) hereinabove. Though the radiation collection of such reduced height CPC implementations (also referred to herein as truncated CPC devices) is somewhat reduced (~7%), this reduction in the flux collection is considered acceptable since the reflective surface areas of the device are substantially reduced, resulting in a substantially smaller CPC device, which simplifies its production and reduces costs.

Figure 3A:
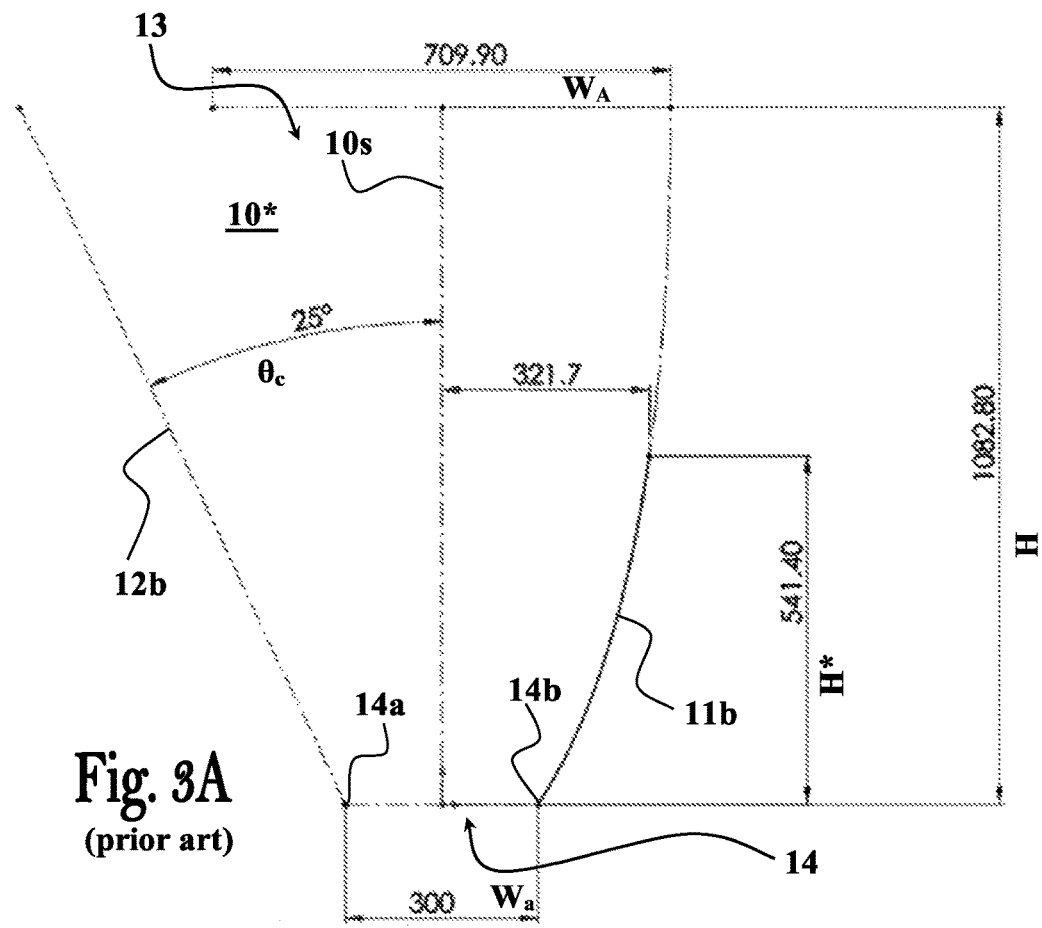
Figure 3B:
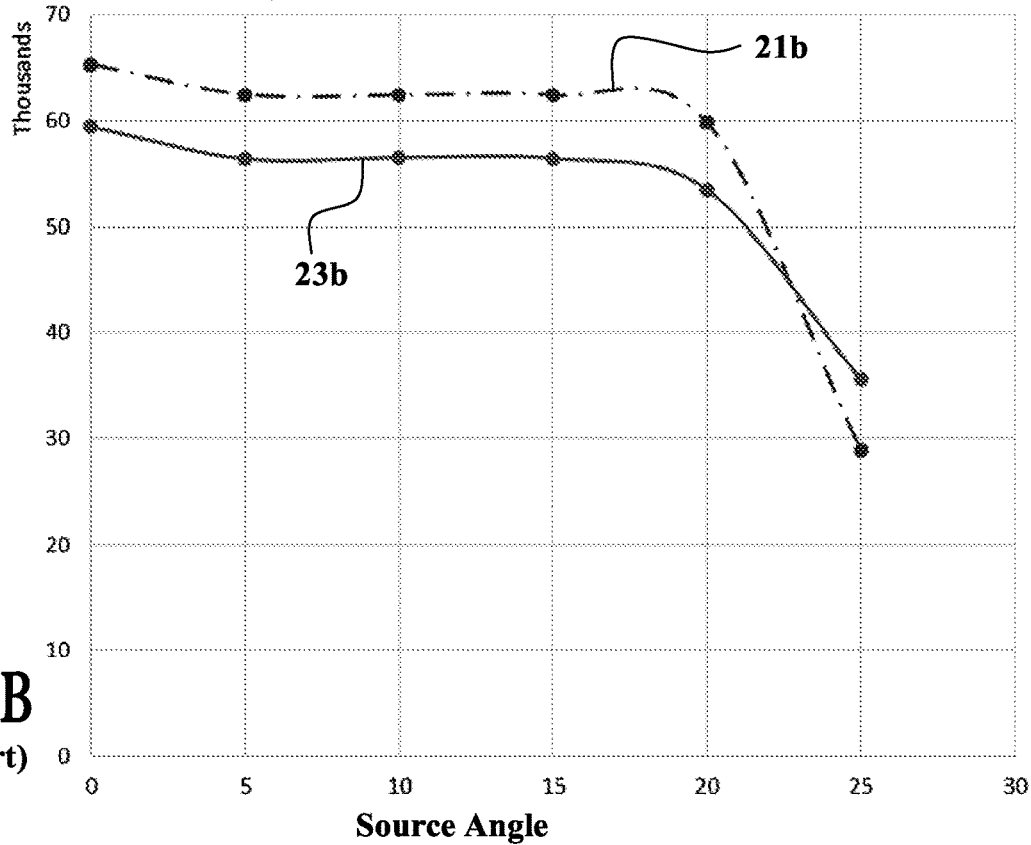

FIG. 3A show a truncated CPC implementation 10* of the classical CPC device 10 shown in FIG. 2A. In this non-limiting example the height H* of the truncated CPC is about a half of the full-height H of the classical the CPC device 10 i.e., H*=H/2. As seen in FIG. 3B, showing plot 23b of the radiation collection of the truncated CPC device 10* compared to the radiation collection of the full-height classical CPC design 10 shown in plot 21b, the reduction in radiation collection of the truncated CPC device 10* is about 7%, for a 50% height reduction. Therefore, in some embodiments, the height of the CPC device is reduced to about 0.5 of the height of the classical CPC device having the same exit aperture $W_a$ and the same acceptance angle $\theta_c$.

Figure 4A:
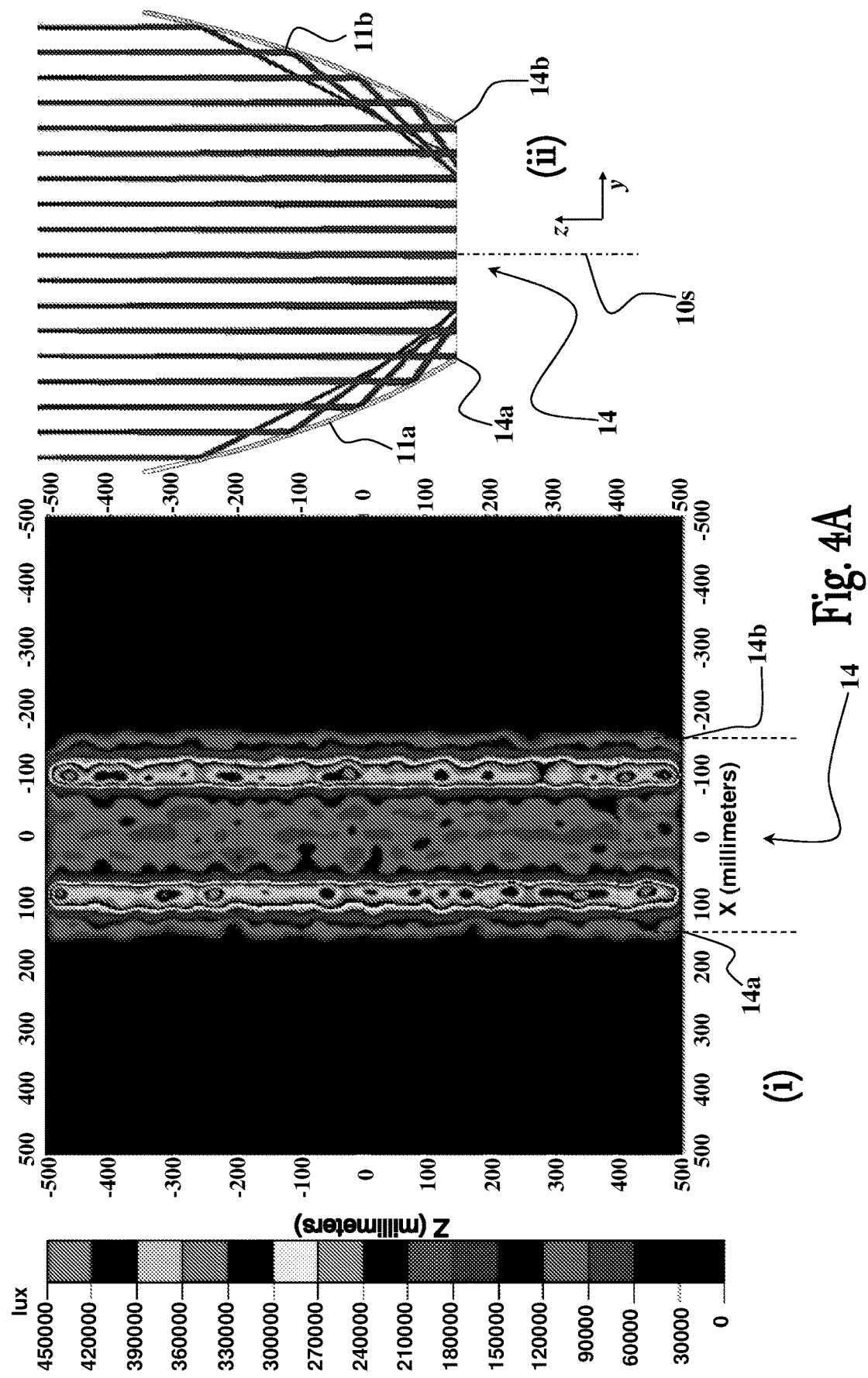
FIGS. 4A to 4C show illumination maps and ray tracing diagrams obtained in solar radiation source simulations of the truncated CPC device of FIG. 3A at 0°, 20° and 25°, illumination angles, respectively.
Figure 4B:
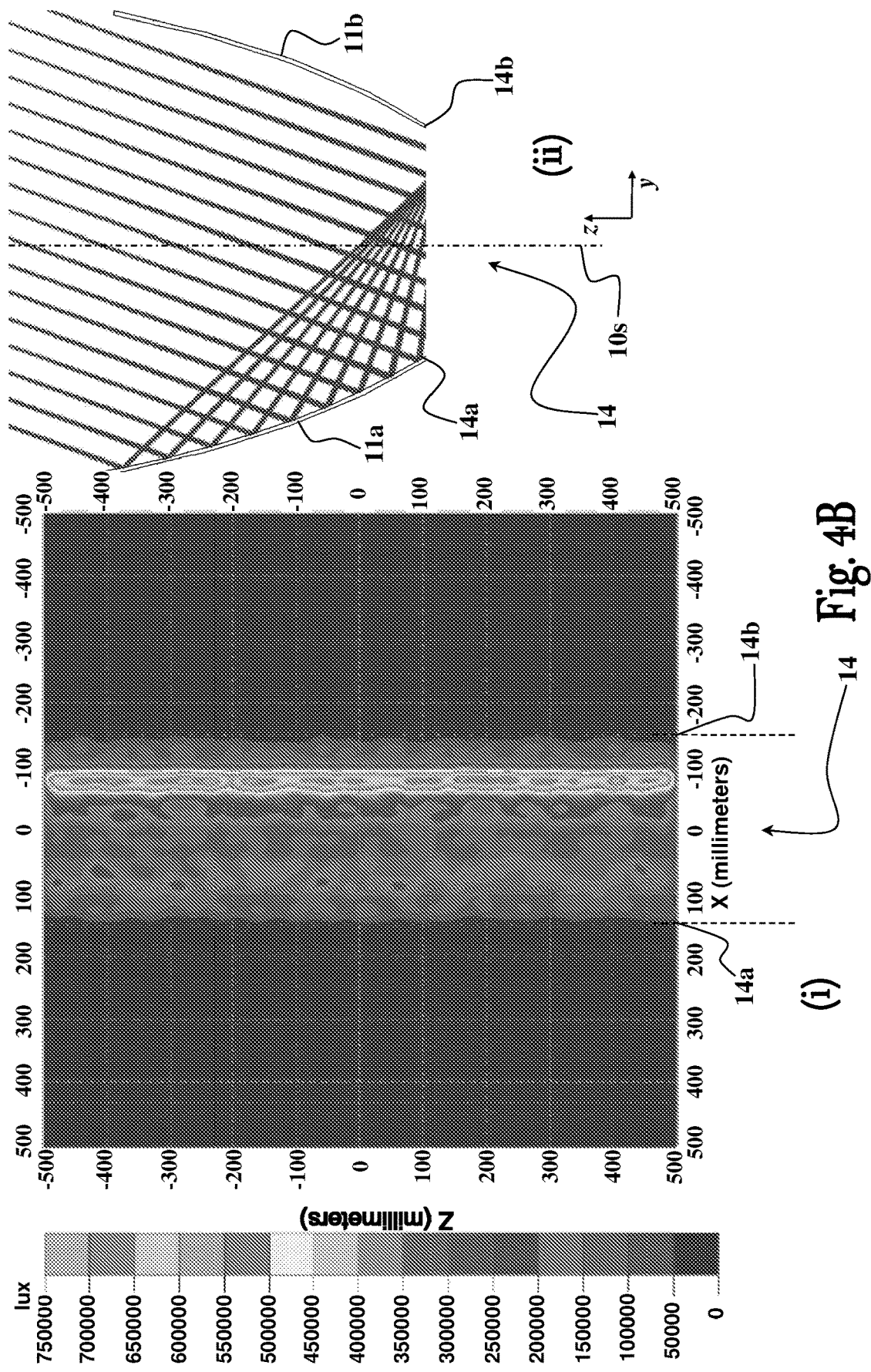
Figure 4C:
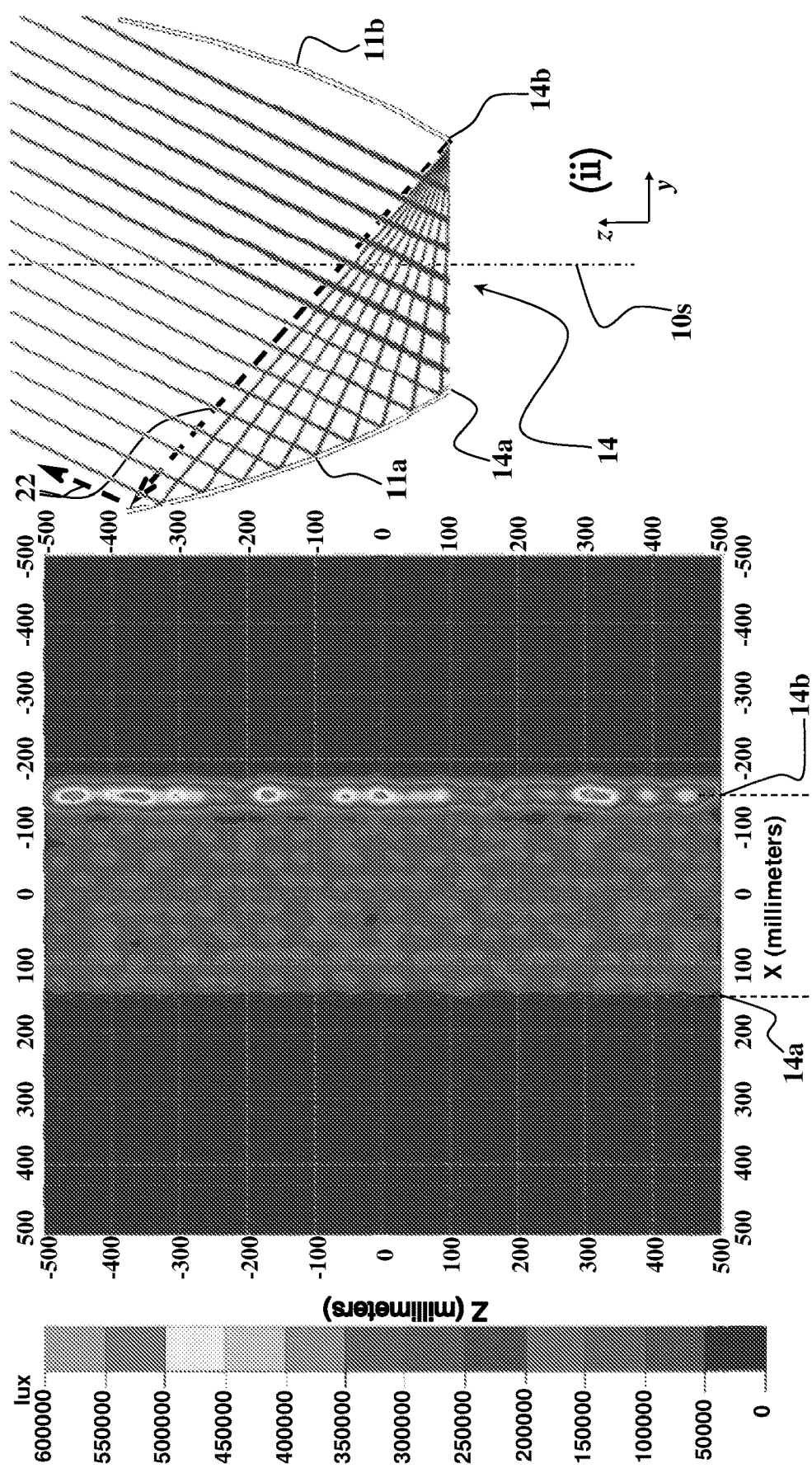

FIGS. 4A to 4C show (i) illumination maps and (ii) ray tracing diagrams, obtained in solar radiation source simulations of the truncated classical CPC collector 10* of FIG. 3A, at 0°, 20° and 25°, illumination angles, respectively. In FIG. 4A the location of the solar source forms a 0° angle with the optical axis 10s of the CPC device 10*, and the solar source's radiation rays are not fully collimated such that diverging rays are obtained and maximal radiation collection is obtained along two strips at about 100 millimeters to the right and to the left of the centerline of the exit aperture i.e., removed from the edges 14a and 14b of the exit aperture 14 by about 50 millimeters.

In FIG. 4B the solar source is translated towards the edge 14b of the exit aperture 14 forming a 20° angle with the optical axis 10s of the CPC collector 10* and in this state the maximal radiation collection is obtained concentrated along a single strip removed from the edge 14b by about 75 millimeters (more or less centered between the edge 14b and centerline of the exit aperture 14).

In FIG. 4C the solar source is further translated towards the edge 14b of the exit aperture 14, forming a 25° angle with the optical axis 10s of the CPC collector 10* (i.e., exactly at the acceptance angle of the CPC collector 10), and maximal radiation collection is obtained concentrated along a single strip located on the edge 14b, such that part of the concentrated radiation strip is obtained outside of the exit aperture 14. In this state part of the concentrated radiation falls on a lower section of the parabolic reflector 11b and reflected therefrom onto the opposing parabolic reflector 11a, and therefrom it is ejected outside from the classical CPC collector 10* (as shown by the dashed arrowed lines 22), and therefore lost. The same radiation loss phenomena of course occur at the opposite state, when a −25° angle is formed between the incoming radiation and the optical axis 10s of the CPC collector 10*.

Figure 4D:
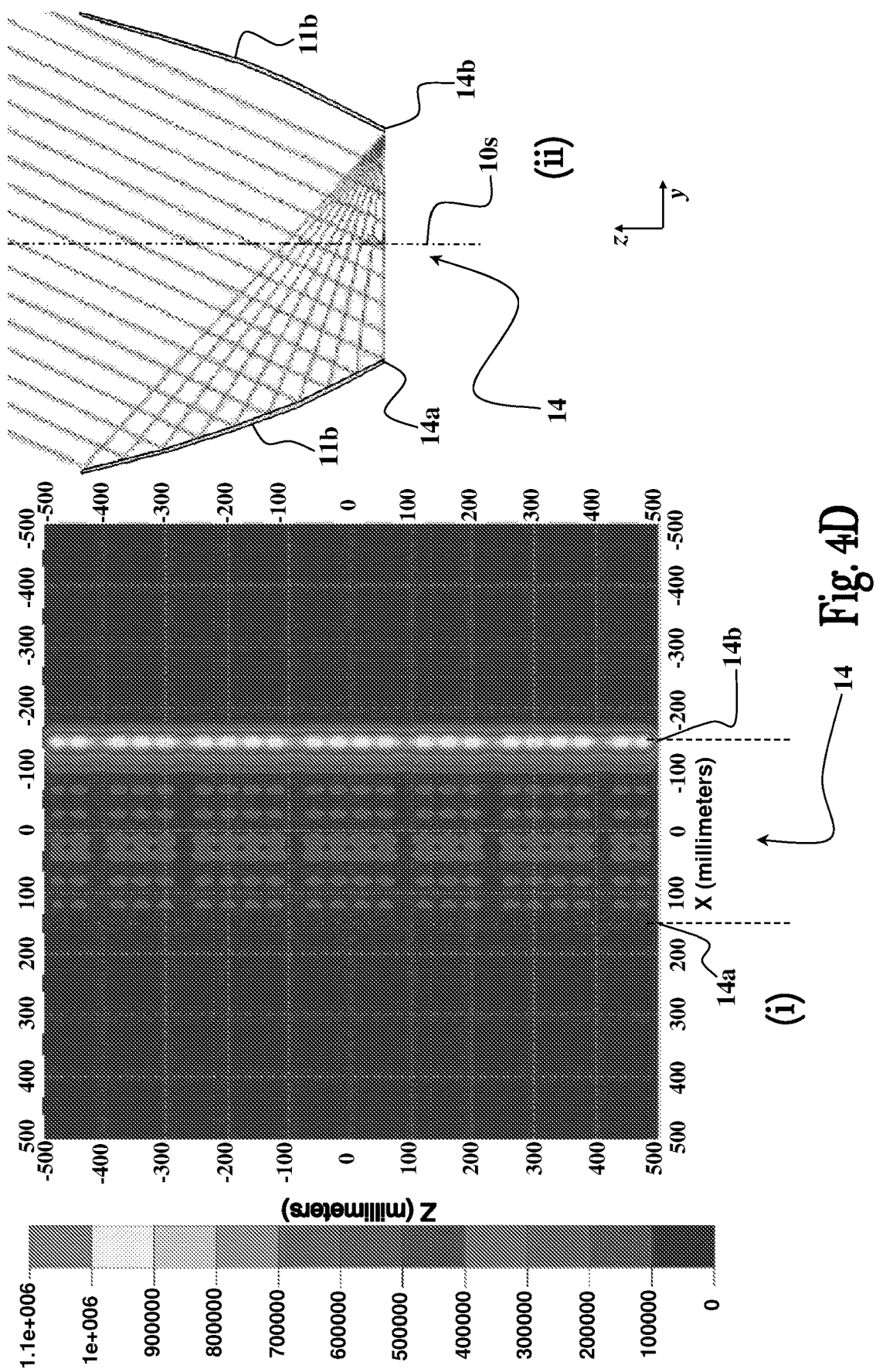
FIG. 4D shows illumination map and ray tracing diagram obtained in a point radiation source simulation of the truncated CPC device of FIG. 3A for a 25° illumination angle.

FIG. 4D shows an illumination map (i) and a ray tracing diagram (ii) obtained for a point radiation source simulation of the truncated CPC collector device 10* of FIG. 3A with similar illumination conditions as in FIG. 4C i.e., a 25° illumination angle of the point source being equal to the acceptance angle $\theta_c$ of the device. As seen, the maximal collected radiation is well concentrated along a slender strip adjacent the edge 14b. In such ideal/theoretical conditions (obtained for a point source) no light gets ejected from the CPC device 10 even at the maximal illumination angle of the device. Particularly, in case of an ideal/theoretical point source the incoming radiation rays are truly collimated, and the CPC device 10 concentrates them to a nearly perfect line (with minimal thickness and higher concentration values), which thus theoretically enables utilizing the full angular potential of the classical CPC collector 10.

In static solar lighting applications, which strongly rely on uniform light collection across angular design acceptance angles of their CPC collectors, the decreased radiation collection obtained near the edge of the acceptance angle (as shown in FIG. 4C) causes severely reduced performance at seasonal extremities, and whenever the location of the radiation source cause illumination angles that are near the angular spans edge of the CPC device.

It is evident from the simulation results provided in FIG. 4A to 4D that a single parabolic reflector may be used to effectively collect incident radiation received at angles between 0° and $+\theta_c$, while losing most of the incident radiation received at angles between 0° and $-\theta_c$ (or wise versa). Accordingly, in possible embodiments a single reflector element configured according to principles of the invention may be used in the radiation collection devices. However, as will be described hereinbelow, a single reflector element may be designed as a revolution object configured according to principles of the invention to effectively collect incident radiation received at angles between $-\theta_c$ and $+\theta_c$.

The present application aims to provide CPC collector designs suitable for static solar lighting applications. Design considerations for such applications includes, inter alia, maintaining a substantially constant radiation collection acceptance properties across the designed angular span (i.e., between $-\theta_c$ and $+\theta_c$), obtaining minimal overall collection loss (integrated over the angular span).

In addition, an important practical consideration in some embodiments is keeping a minimal height H of the CPC collector, since higher CPC troughs perform poorly in cloudy diffused conditions. The full-height CPC trough-shaped devices also entail larger reflector areas, cost and weight.

A possible solution to the above is, in some embodiments, the use of a CPC collector designed for a wider angular span. For example, a CPC collector requiring uniform radiation collection within some predetermined angular span (e.g., 25°), may be designed to provide a somewhat greater angular span (e.g., 30°), so as to move the diminished collection zone out of the effective working angle of the device.

Figure 5A:
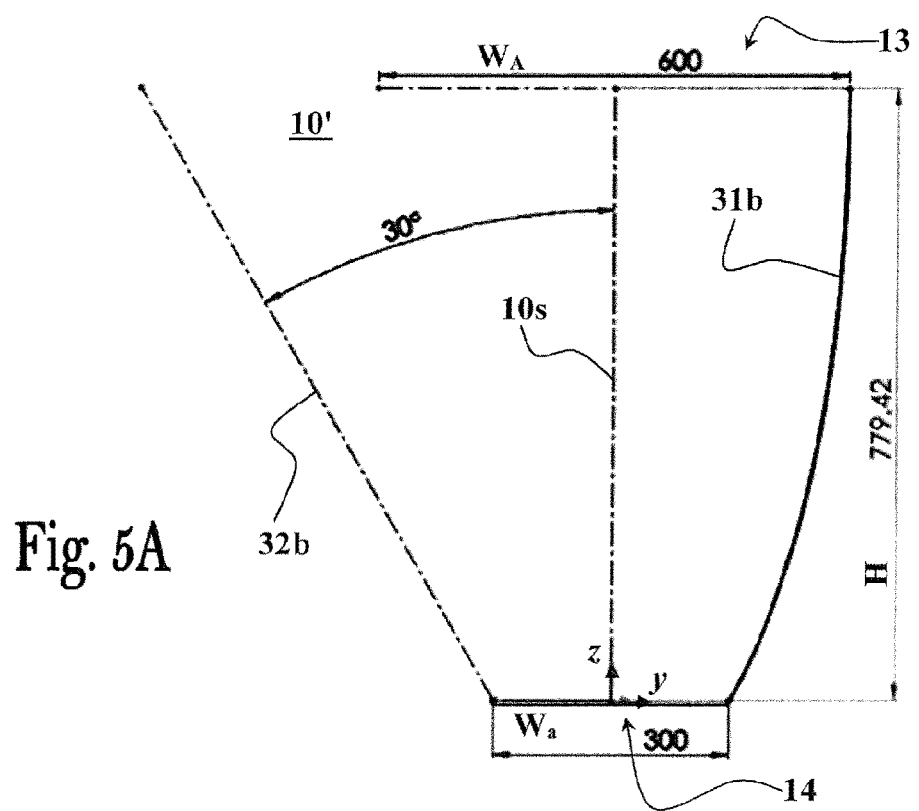
Figure 5B:
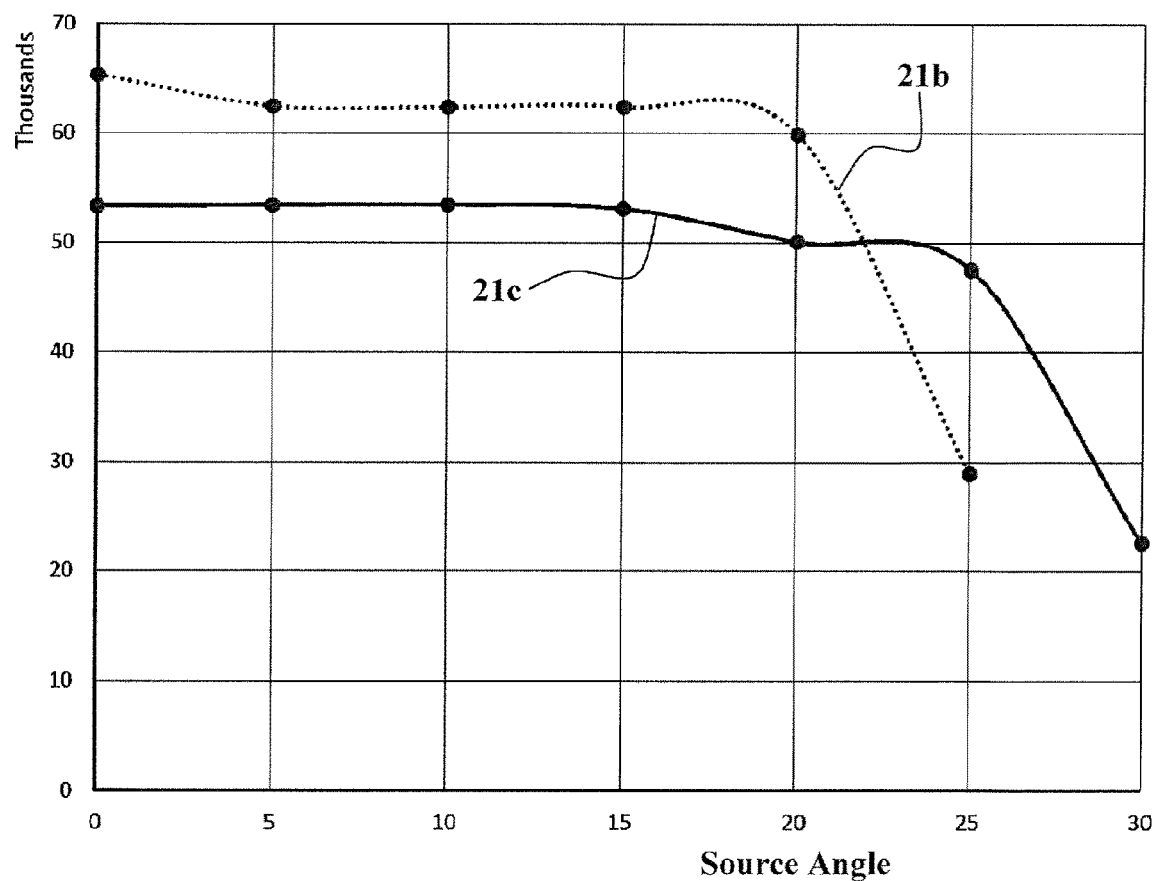

By way of a non-limiting example, FIGS. 5A and 5B show simulation of a full-height classical CPC design 10' having a 30° acceptance angle and concentration value of 2, designed for collection of radiation within a 25° angular span i.e., the acceptance angle is increased by 20%. As seen in FIG. 5A, showing the full-height CPC device 10', the height H of the CPC device 10' is almost twice (~44% greater) the height H* of the classical (50%) truncated CPC device 10 shown in FIG. 3A. FIG. 5B respectively shows plots 21c and 21b of the flux collection obtained in solar radiation source simulations of the CPC device 10' of FIG. 5A and of the classical (full-height) CPC device 10 of FIG. 2A. As seen, a 94% overall efficiency is obtained in this non-limiting example within the desired angular range/span (−25° to +25°). Though performance wise this may appear to be an acceptable compromise, the substantial increase in the height of the CPC device 10' by 189% compared to the height of the classical 0.5 truncated CPC device 10, render this approach as a costly solution in terms of reflective area surfaces, device weight and construction burden.

In order to resolve the above-mentioned deficiencies, in preferred embodiments modified CPC collectors are designed such that the parabolic focuses of their parabolic surfaces is shifted inwardly towards the centerline of the exit aperture of the device. As the rays of the solar sources are concentrated to a strip centered about the parabola focuses of the parabolic surfaces, moving their parabola focuses inwardly into the exit aperture ensures that all of the radiation received at the entrance aperture within the angular span of the device is trapped and cannot escape out of the device, and thus concentrated and hits the target (not shown) of the device. In this way, when the illumination angles of the incoming radiation are near, or equal to, the acceptance angle of the modified CPC device, the collected radiation is concentrated along a strip shifted inwardly towards the centerline of the exit aperture of the device, which prevents the escape of portions of the incoming radiation out of the device (exemplified in FIG. 2C).

Figure 6A:
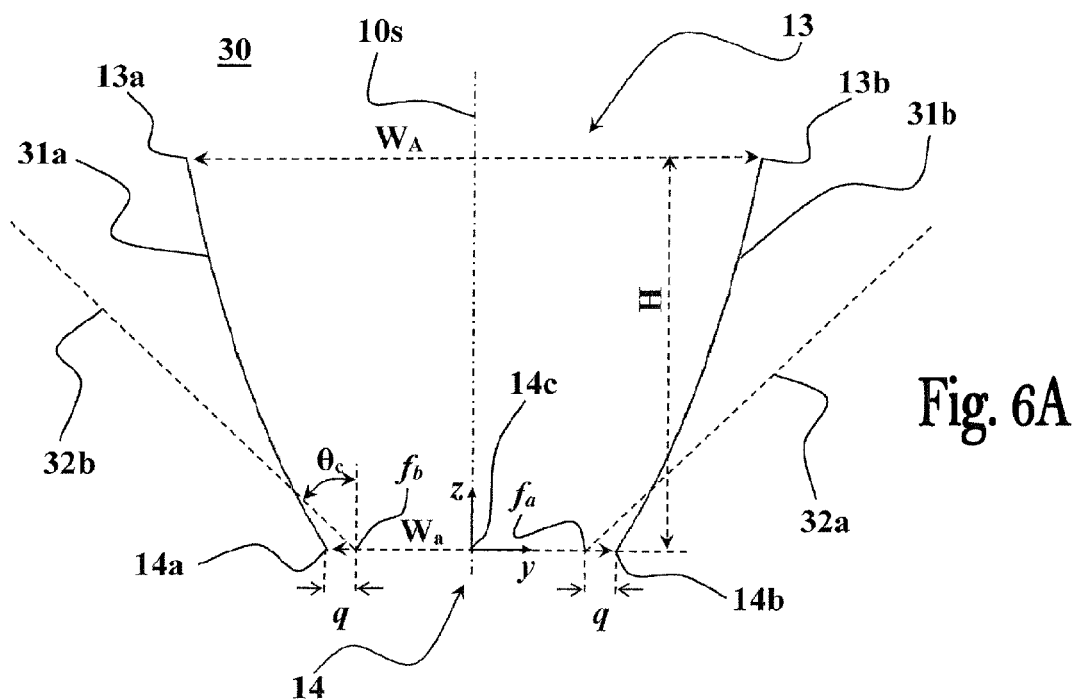
FIG. 6A and FIG. 6B schematically illustrate sectional and perspective views, respectively, of modified two-dimensional CPC devices according to some possible embodiments.
Figure 6B:
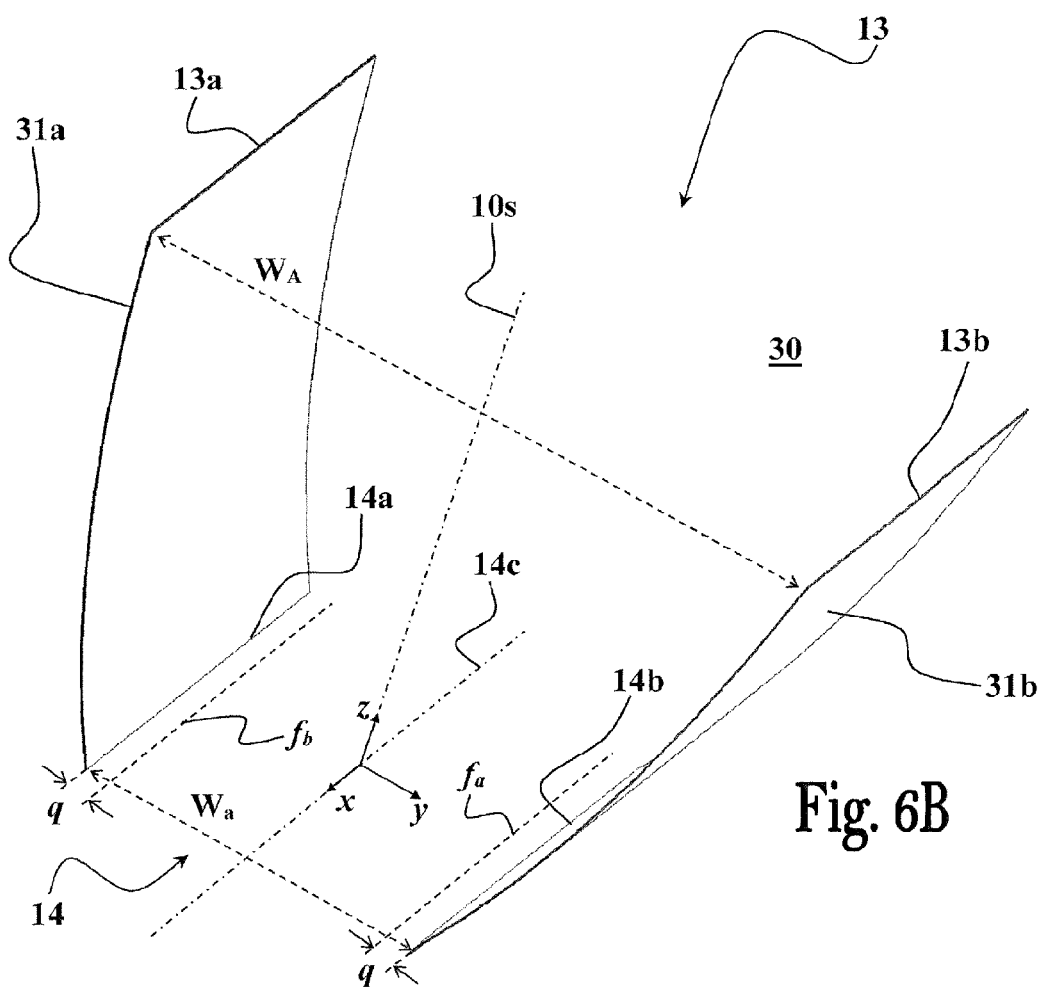

FIG. 6A and FIG. 6B schematically illustrate sectional and perspective views, respectively, of a modified two-dimensional CPC device 30, according to some possible embodiments, in which the focuses $f_a$ and $f_b$ of the parabolic surfaces 31a and 31b are shifted towards the centerline 14c of the exit aperture 14. As will be exemplified hereinbelow, designs of the modified CPC device 30 can provide collector structures having substantially the acceptance angle $\theta_c$ and concentration ratio ($W_A/W_a$) as of the classical CPC design 10 shown in FIGS. 1 and 2A, but with substantially improved radiation collection uniformity throughout the angular span of the device and in certain embodiments with somewhat increased device height H.

It is now understood that for concentration ratios of about 2 the shift distance q of the focuses $f_a$ and $f_b$ of the parabolic surfaces 31a and 31b towards the centerline 14c of the exit aperture 14 can be set up to 0.27 of the width $W_a$ of the exit aperture 14. Optionally, and in some embodiments preferably, the shift distance q of the focuses $f_a$ and $f_b$ of the parabolic surfaces 31a and 31b towards the centerline 14c of the exit aperture 14 is about 0.2 of the width $W_a$ of the exit aperture (i.e., $q/W_a \cong 0.2$).

FIGS. 7A and 7B present simulation of a modified truncated CPC design 30 according to possible embodiments having 25° acceptance angle and concentration value of 2. In this non-limiting example the shift distance q of the focus points ($f_b$) of the parabolic reflectors is one tenth (0.1) of the width of the exit aperture 14 of the modified CPC device 30 (i.e., q=30, $q/W_a$=0.1), which thus translates the parabola axis (12b) of the classical CPC design towards the optical axis 10s, at the 32b.

As seen in FIG. 7A, showing a schematic illustration of the modified truncated CPC device 30, the height H' of the modified truncated CPC design 30 is 456.36 mm. In this specific and non-limiting example the height of the device has been adjusted to maintain a concentration ratio of 2. More particularly, in order to move the optical focuses $f_b$ towards the optical axis 10s, as obtained in modified CPC device 30, curvature of the reflectors has been modified, thus resulting in different parabolic curves (different concave depth) of the reflective surfaces of the device. Thus, in order to maintaining the desired concentration ratio, the height of the reflectors has been adjusted for setting an entrance aperture width that provides the needed concentration ratio ($W_A$=600 mm).

FIG. 7B respectively shows plots 21b, 21c and 21d, of the flux collection obtained in solar radiation source simulations of the CPC devices 10 and 10' of FIGS. 2A and 7A, respectively, and with the modified CPC device 30 of FIG. 7A. As seen, the radiation collection of the modified CPC device 30 over its 25° acceptance angle, as presented by plot 21d, is nearly uniform across the angular span, and substantially more uniform than the radiation collection of the CPC devices 10 and 10' presented in the plots 21b and 21c.

FIGS. 8A to 8D schematically illustrate modified three-dimensional CPC designs according to some possible embodiments. FIG. 8A shows a rectangular funnel-shaped modified CPC device 60 constructed from four parabolic reflectors 61 positioned to form a generally rectangular sectional shape, and designed to provide focal regions ($f_r$, shown in FIG. 8B) inwardly displaced from the edges of the exit aperture 64 of the modified CPC device 60 towards the focal axis 60s of the device. The funnel-shaped modified CPC device 60 can be constructed from two modified two-dimensional CPC devices 30 of FIGS. 6A and 6B, by properly mounting the parabolic reflectors 31a and 31b of one modified two-dimensional CPC device 30 at the lateral sides (parallel to the yz plane) of the other modified two-dimensional CPC device 30.

FIG. 8B shows a top view of the funnel-shaped modified CPC device 60 constructed by intersecting two modified two-dimensional CPC devices 30a and 30b (e.g., each device being a modified truncated two-dimensional CPC device 30 of FIGS. 6A and 6B) which centerlines 14c cross each other perpendicularly. In this specific and non-limiting example a square funnel-shaped modified CPC device is obtained, which focal regions $f_r$ fall of (and/or within) a square within, and concentric with, the edges of the exit aperture 64 of the device 60.

Of course, the intersecting of more than two modified two-dimensional CPC devices 30 may be used to construct other polygon-shaped funnel-shaped modified truncated (or full-height) CPC devices. For example, and without being limiting, FIG. 8C shows a top view of a modified truncated (or full-height) three-dimensional CPC device 65 having a hexagonal funnel shape constructed by intersecting three modified truncated (or full-height) two-dimensional CPC devices 30a, 30b and 30c, which centerlines 14c cross each other at 120° angles. Similarly, the focal regions $f_r$ of the modified CPC device 65 fall on (and/or within) a hexagon within, and concentric with, the edges of the exit aperture 66 of the device 65.

FIG. 8D shows a sectional view of a skirt-shaped modified truncated (or full-height) three-dimensional CPC device 67 designed as a revolution object obtained by revolving a modified parabolic curve of the reflectors described herein about the optical axis 67s of the device 67. In this way, a circular funnel-shaped reflector is obtained having circular concentric entrance aperture 69i with radius $r_A$, and a circular exit aperture 69o with radius $r_a$. Accordingly, the width $W_A$ of the entrance aperture 69i of the cylindrical funnel-shaped reflector 67 is defined by the diameter $(2 \cdot r_A)$ of its upper opening, and the width $W_a$ of its exit aperture 69o is defined by the diameter $(2 \cdot r_a)$ of its bottom opening. The focal regions $f_r$ of the circular funnel-shaped reflector 67 fall on (and/or within) a circle obtained within, and concentric with, the edges of the exit aperture 69o.

FIG. 8D further shows a cylindrical target object 68 (e.g., light guide) configured to receive the collected light concentrated at the exit aperture 69o and transfer it to a desired location for use (e.g., lighting, heating, conversion, etc.). In this non-limiting example the diameter of the cylindrical target object 68 is configured to substantially match the width $W_a$ of the exit aperture 69o of the device 67.

It is noted that similar target objects (not necessarily of cylindrical shape) can be used at the exit aperture of any of the modified (truncated or full-height) CPC devices described herein, to receive the collected radiation and deliver it to a predetermined location/facility. The shift distance q of the focus of the parabolic surfaces of the different modified CPC devices described herein is in some embodiments about 0.02 to 0.27 of the width $W_a$ of the exit aperture of the respective CPC device, optionally about 0.2 of the width $W_a$ of the exit aperture (i.e., $q/W_a \cong 0.2$).

The radiation collectors, and modified (truncated or full-height) CPC devices, described herein, may be fabricated from any good quality mirrors for the collected wavelength, such as, but not limited to, metallic, polymer or glass mirrors. Such radiation collectors may also be constructed using total internal reflection (TIR) effect, by creating a high refractive index volume, contained within the following surfaces: input and output plains, symmetrical concave (parabolic or other) converging/tapering surfaces, that are being immersed in a relatively lower refractive index medium. A TIR CPC would be an effective solution in relatively smaller CPCs due to weight considerations. Possible production methods may include, but not limited to: sheet-metal forming including curve approximation by division into flat segments, composite materials lamination, vacuum formed thermo-polymers, cold molding of flexible sheets, and spatial positioning of discreet mirrored facets combined to form the aforementioned converging/tapering concave reflective surfaces.

One or more reflective layers (e.g., silver, gold, aluminum or any other reflective substance, such as, but not limited to reflective polymer) may be applied (e.g., by sputtering, electroplating or painting) at least on the inner surfaces of the reflectors. The concentration ratio ($W_A/W_a$) of the modified CPC devices can effectively be in the range of 1 to the maximal possible concentration (for a 2D CPC in air would being about $1/\sin(\theta_c)$ or up to $1/\sin^2(\theta_c)$ in case of a surface revolution 3D CPC).

As discussed and exemplified hereinabove, while the height of some embodiments of the modified CPC device is somewhat increased in comparison to the height of the classical CPC design having the same exit aperture and same acceptance angle (also referred to herein as the counterpart classical CPC design), but the increase in the height of the modified CPC devices described herein is relatively small (about 0.1 to 0.31 of the height of the counterpart classical CPC design).

Figure 9:
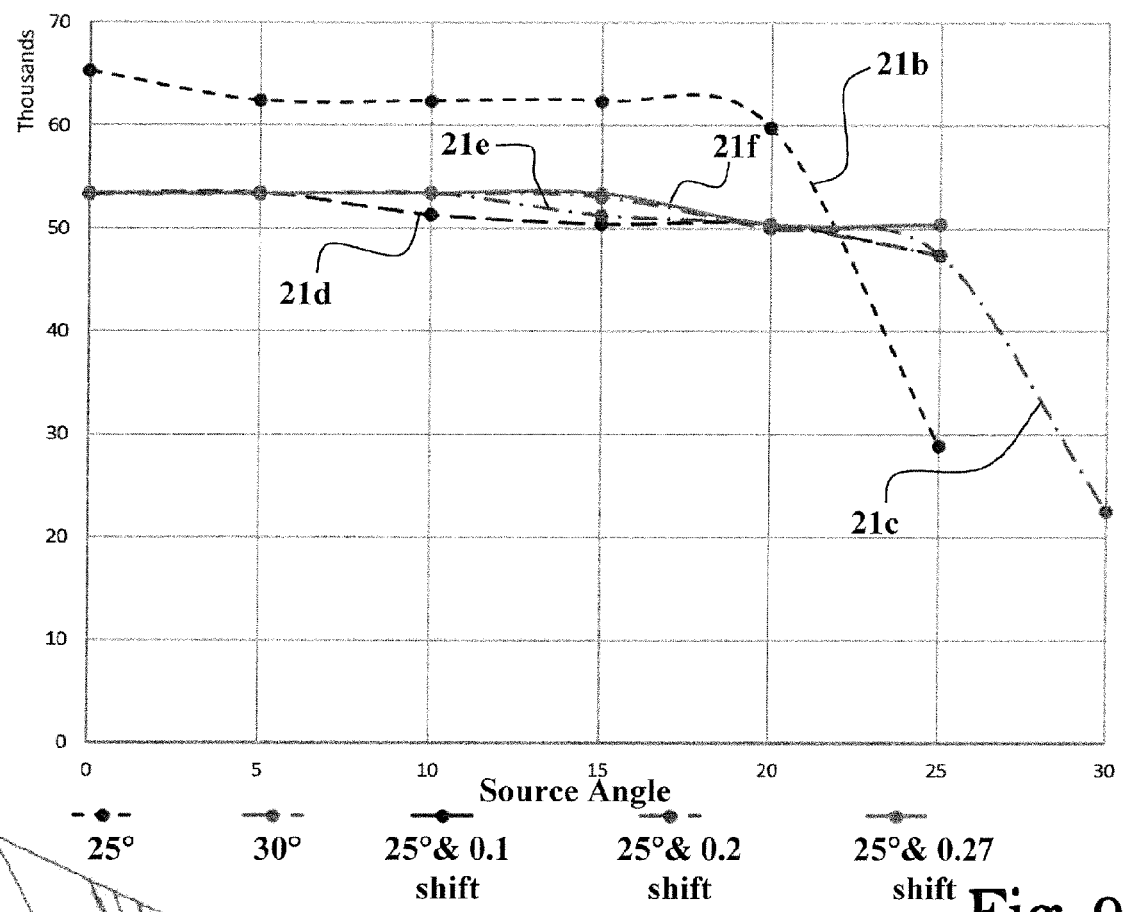
FIG. 9 show flux collection plots obtained in solar radiation source simulations of classical CPC devices and of modified CPC devices according to possible embodiments.

FIG. 9 shows the flux/radiation collection plots 21b, 21c and 21d, obtain in the solar radiation source simulations of the classical and modified CPC designs described hereinabove, together with a flux/radiation collection plots 21e and 21f obtained for solar radiation source simulations of a modified CPC design with acceptance angles $\theta_c=25°$ and focus shifts q from the edges of the exit aperture of $0.2 \cdot W_a$ and $0.27 \cdot W_a$, respectively. As seen, the flux collection plots 21e (obtained for $\theta_c=25°$ and $0.2 \cdot W_a$ focus shift) and 21f (obtained for $\theta_c=25°$ and $0.27 \cdot W_a$ focus shift) are nearly uniform across the angular span. It is noted that the $0.27 \cdot W_a$ focus shift is considered to be the geometrical limit for possible focus shifts of the modified CPC design that enables maintaining the desired concentration ratio (i.e., as of the classical CPC design). It should be therefore understood that while focus shifts greater than $0.27 \cdot W_a$ from the edge of the exit aperture are possible, such implementations results in a significant change of the CPC design, which will typically impose a change in the concentration ratio of the device.

The following table presents various results obtained in the solar radiation source simulations of the various modified truncated CPC designs described hereinabove:

| CPC type | 1 - Classical $\theta_c = 25°$ | 2 - Classical $\theta_c = 30°$ | 3 - Modified $\theta_c = 25°$, focus shift of $0.1 \cdot W_a$ | 4 - Modified $\theta_c = 25°$, focus shift of $0.2 \cdot W_a$ | 5 - Modified $\theta_c = 25°$, focus shift of $0.27 \cdot W_a$ |
|---|---|---|---|---|---|
| Total flux Collected (lux) | 328,941 | 310,797 | 306,684 | 309,455 | 314,774 |
| Total [%] compared to type 1 | 100% | 94% | 93% | 94% | 96% |
| Min/Max [%] at 0~25° | 64% | 89% | 89% | 89% | 94% |
| CPC Height [mm] | 412.5 | 779.4 | 456.4 | 541 | 746.3 |
| Height [%] compared to type 1 | 100% | 189% | 111% | 131% | 181% |

The concentration ratios of all CPC devices/types in the above table are $W_A/W_a=2$. As seen from the above results, the modified CPC design of type 3 or 4 ($\theta_c=25°$, focus shift of $0.1 \cdot W_a$ or $0.2 \cdot W_a$) appears to provide good results with relatively small increase in the height of the device and somewhat reduced flux collection performance.

Figure 10A:
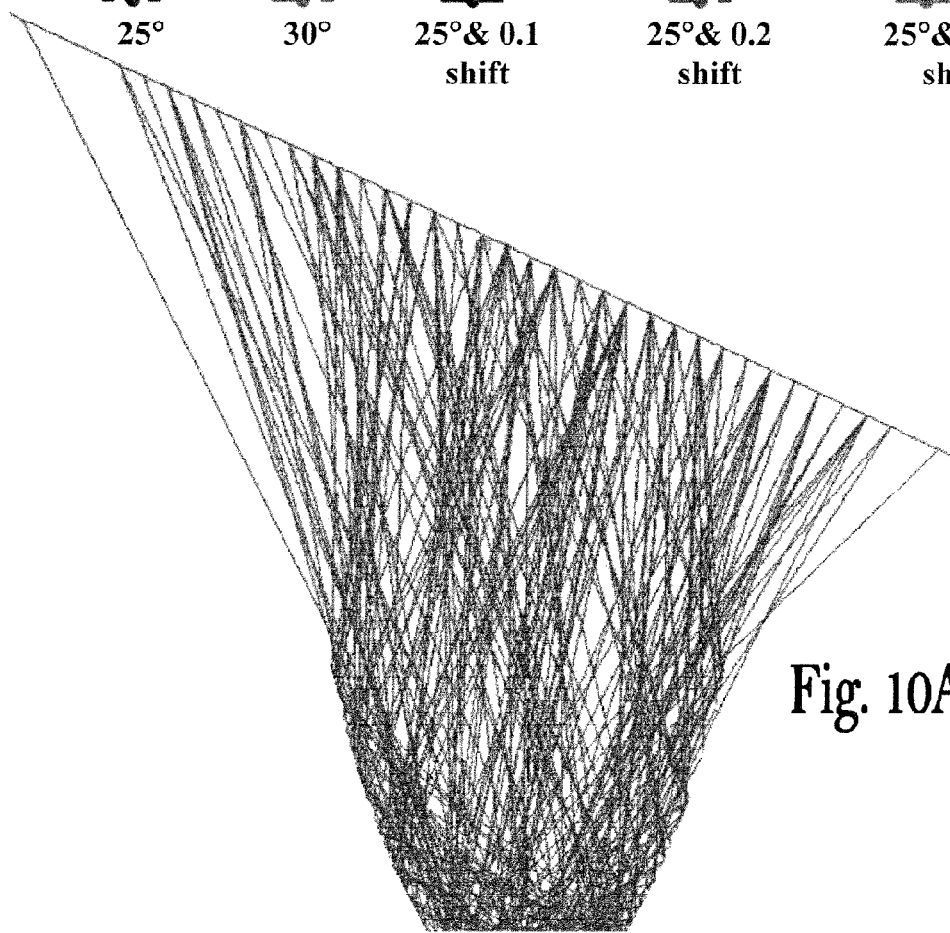
Figures 10B, 10C:
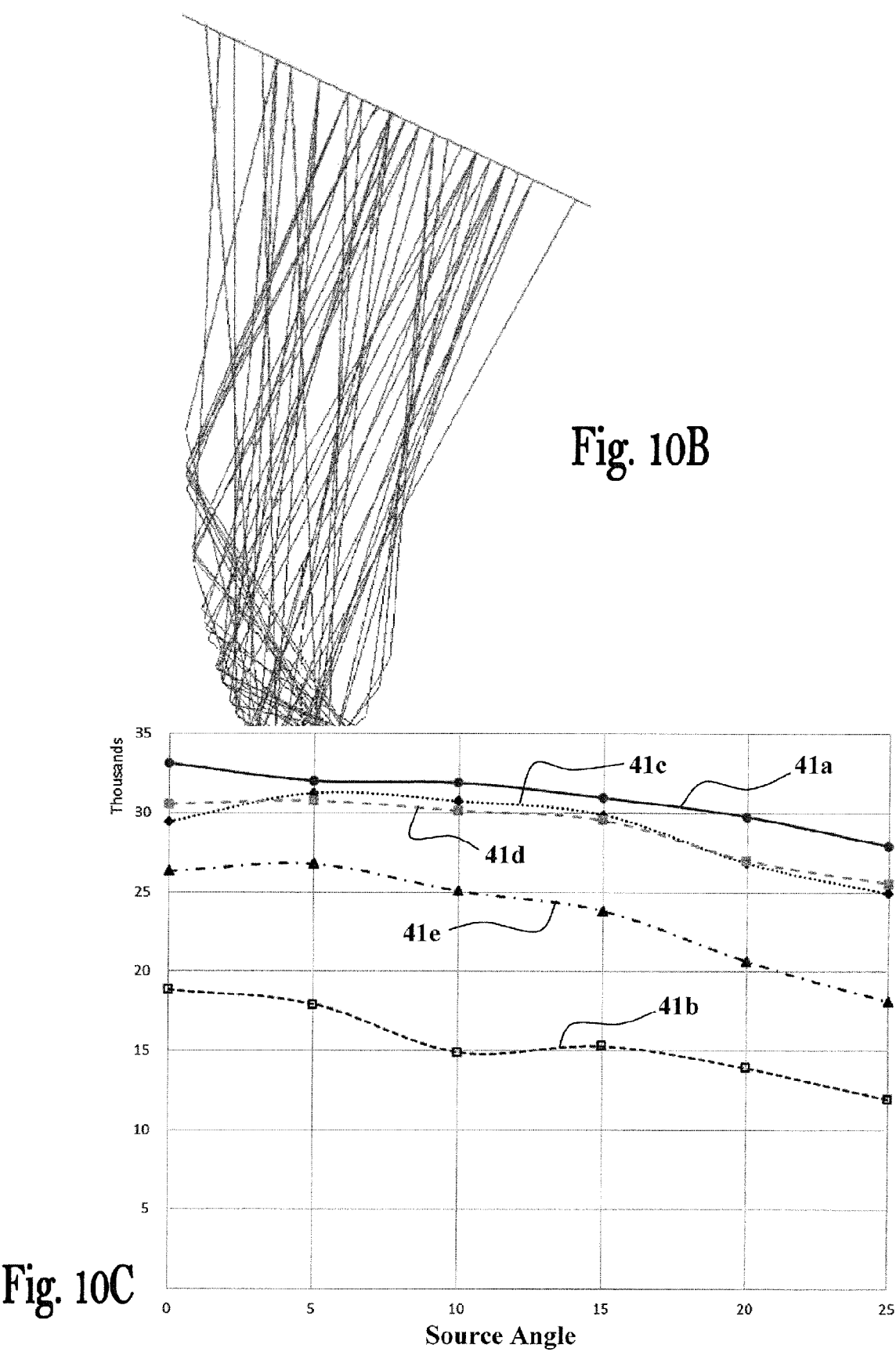

FIGS. 10A and 10B show ray tracing diagrams of a truncated CPC design having acceptance angle of $\theta_c=25°$, and a full-height CPC design having acceptance angle of $\theta_c=30°$, respectively, obtained for large ray divergence conditions (e.g., simulating dispersed "cloudy" conditions). As seen in FIG. 10A, wide acceptance angle is achieved in the ray tracing diagram of solar source simulation obtained for the truncated modified CPC device with the acceptance angles of $\theta_c=25°$. On the other hand, in the simulation of the full-height classical CPC design with acceptance angle of $\theta_c=30°$, shown in FIG. 10B, the ray tracing diagram present narrow acceptance angle. Comparison of the various CPC designs described herein show that in cloudy conditions angular deviations become much smaller, but the full-height CPC designs perform poorly in such large ray divergence conditions.

FIG. 10C shows plots of flux/radiation collection obtained over the angular span in the large ray divergence conditions simulations, wherein plot 41a shows the flux collection obtained with the classical 50% truncated CPC design with $\theta_c=25°$ (shown in FIG. 3A), plot 41b shows the flux collection obtained with the classical 50% truncated CPC design with $\theta_c=30°$ (shown in FIG. 5A), plot 41c shows the flux collection obtained with the truncated modified CPC design with $\theta_c=25°$ and $0.1 \cdot W_a$ focus shift (shown in FIG. 7A), plot 41d shows the flux collection obtained with the modified truncated CPC design with $\theta_c=25°$ and $0.2 \cdot W_a$ focus shift (shown in FIG. 11A), and plot 41e shows the flux collection obtained with the truncated modified CPC design with $\theta_c=25°$ and $0.27 \cdot W_a$ focus shift. As seen, good radiation collection is obtained in the large ray divergence conditions simulations for the truncated modified CPC designs having acceptance angle $\theta_c=25°$ and focus shifts of $0.1 \cdot W_a$ and $0.2 \cdot W_a$. The radiation collection of the truncated modified CPC designs having acceptance angle $\theta_c=25°$ and focus shifts of $0.27 \cdot W_a$ the large ray divergence conditions simulation is also acceptable, although somewhat reduced (due to the relatively larger CPC height, which is detrimental in these conditions).

Figure 11A:
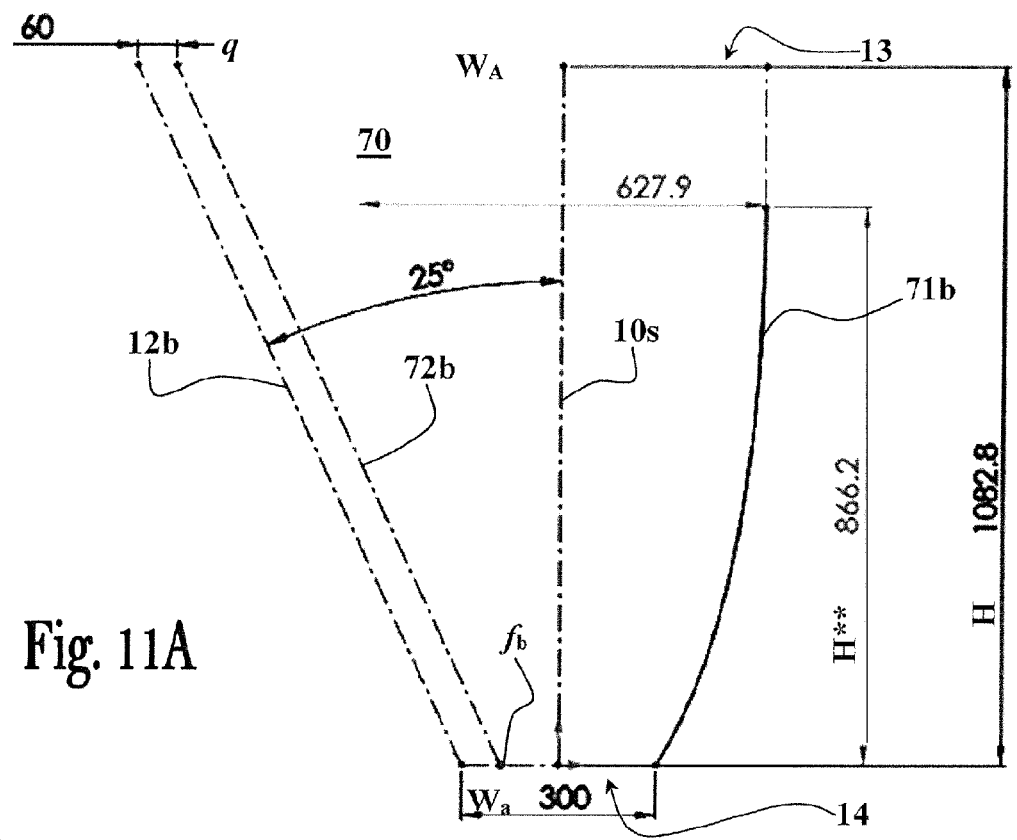
Figure 11B:
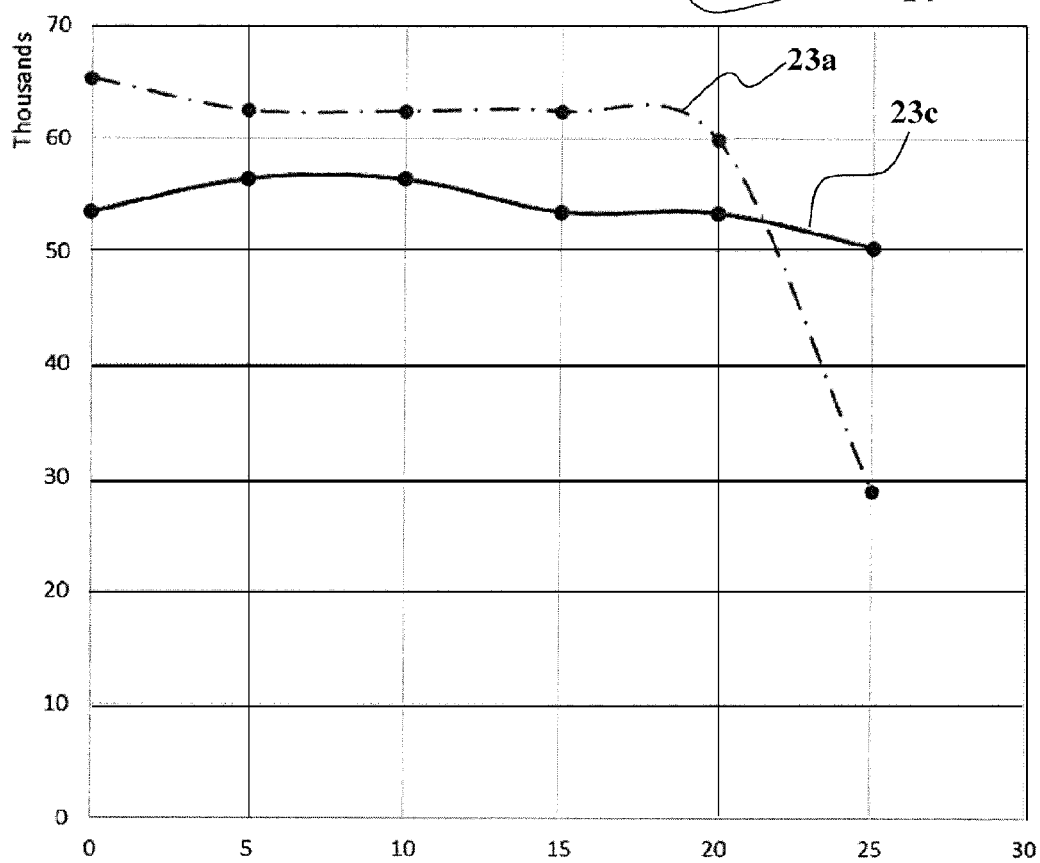

FIGS. 11A and 11B provide another non-limiting comparative example between radiation collection performance of the full-height CPC design having acceptance angle of $\theta_c=25°$ (shown in FIG. 2A) and a non-truncated modified CPC design 70 having acceptance angle of $\theta_c=25°$ and focus shift $0.2 \cdot W_a$, shown in FIG. 11A. As seen, in the truncated modified CPC device 70 the parabolic focuses $f_b$ are shifted (q=60) from the parabola axes 12b of the classical CPC design to the new parabola axes 72b of the modified parabolic reflector 71b. In addition, the height H** of the non-truncated modified CPC device 70 was reduced (to 866.2 mm) due to mathematical limitations imposed by the shifting of the focal point $0.2 \cdot W_a$ towards the optical axis 10s (i.e., for the parabolic reflector to be parallel to the symmetry/optical axis 10s at the entrance aperture 13).

In FIG. 11B the radiation collection (solar source) simulation result of the non-truncated modified CPC design 70 of FIG. 11A shown in plot 23c is compared to the radiation collection simulation of the full-height classical CPC design of FIG. 2A shown in plot 23a. As seen, a noticeably improved angular uniformity is obtained in the radiation collection curve 23c simulated for the non-truncated modified CPC design 70. It is also interesting to note that the improved performance is very similar in this case to the results obtained with the truncated modified CPC designs, but giving an overall collection reduction of only 5%, while achieving excellent angular uniformity across the full collection range.

It is thus appreciated that the modified (focus shifted, truncated or non-truncated) CPC designs disclosed herein, provide optimal performance suited to static solar lighting system. In particular, these modified CPC designs provide:
   substantially uniform light collection across the designed angular span with a realistic finite sized Solar source;
   relatively high efficiency overall performance (minimal loss when compared to classic CPC designs);
   good performance in clear and cloudy conditions; and
   minimal cost, size, and weight, due to relatively low height parabolic reflectors of the modified CPC designs.

Figure 12A:
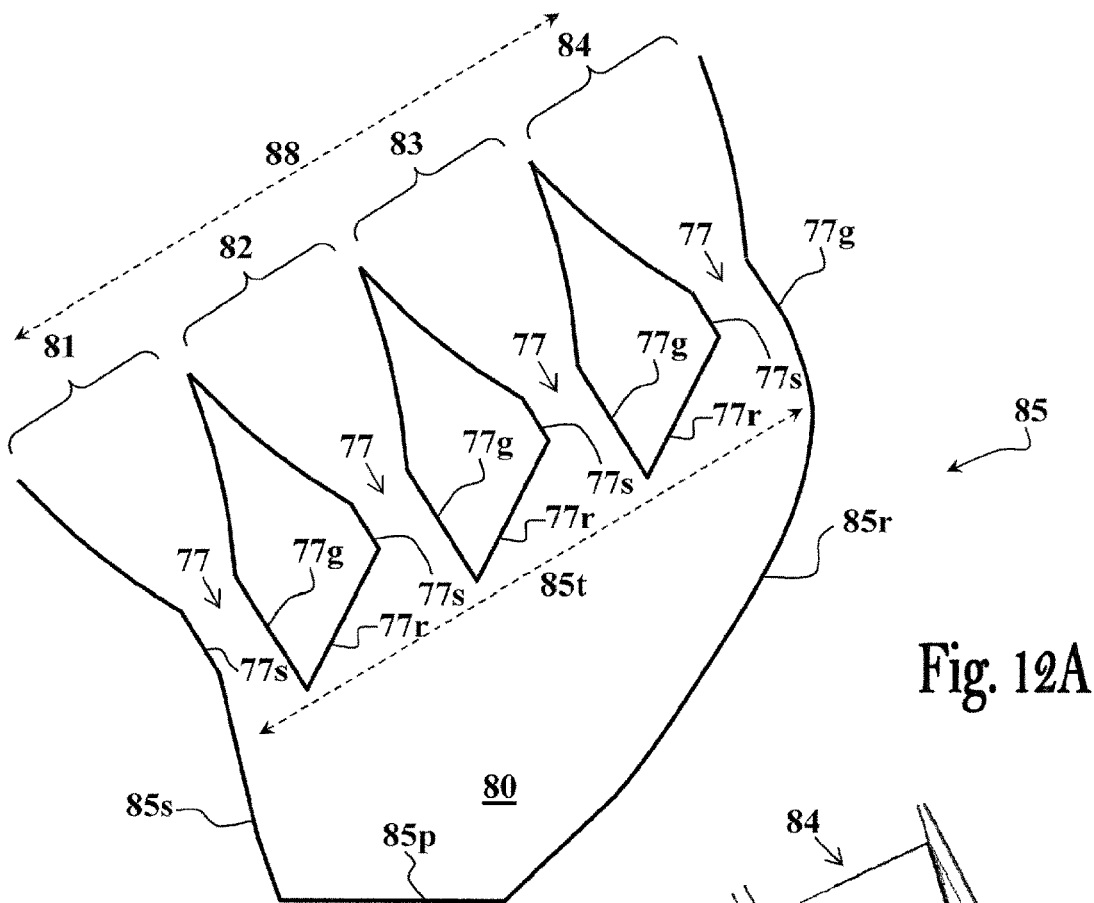

FIG. 12A shows a side sectional view of a radiation collector assembly 80 comprising an array of elongated radiation collectors arranged side by side and oriented so as to maximize radiation collection from a (stellar) radiation source (not shown). The radiation collector assembly 80 further comprises a specially designed radiation guiding structure 85 configured to receive in a large-tilted opening 85t thereof the light radiation collected by the radiation collectors, and direct the received light towards a small-horizontal opening 85p. Optionally, and in some embodiments preferably, the large-tilted opening 85t and the small-horizontal opening 85p have substantially the same shape, but different dimensions and orientations.

In this specific and non-limiting example the radiation collectors array of assembly 80 comprises four elongated radiation collectors, 81, 82, 83 and 84, aligned side by side one parallel to the other, and tilted such that their light collecting openings substantially face the radiation source. Each of the radiation collectors comprises a radiation guiding portion 77 configured to direct and concentrate the collected radiation towards an output opening thereof. The large-tilted opening 85t of the radiation guiding structure 85 is configured to receive the concentrated radiation from the radiation guiding portions 77 of the radiation collectors.

The radiation guiding structure 85 comprises a major (large) reflector 85r portion having a curved/arced shape facing the output openings of the radiation guiding portions 77 of the radiation collectors, 81, 82, 83 and 84, and a minor (small) reflector 85s portion having a flat or slightly curved shape. The major reflector 85r is configured to direct the light received from the output openings of the radiation guiding portions 77 towards the small-horizontal opening 85p and/or the minor reflector 85r, and the minor reflector 85r is configured to direct internally reflected rays towards the small-horizontal opening 85p and/or the major reflector 85r.

Optionally, and in some embodiments preferably, each radiation guiding portion 77 of the radiation collectors comprises a relatively short anterior reflector portion 77s, a relatively longer posterior reflector portion 77g, and a tilted reflector portion 77r connecting between the anterior and posterior reflector portions, 77s 77g, of adjacently located radiation reflectors. The tilted reflector portions 77r are configured to direct internally reflected rays towards the small-horizontal opening 85p and/or the major reflector 85r.

This configuration of the radiation collector assembly 80 provides a substantially stable collector structure that can be easily and readily installed on roofs of buildings, or any flat horizontal surface, per design needs. The radiation collector assembly 80 can advantageously arrange an array of radiation collectors to form a substantially equilateral radiation receiving front 88 i.e., having an equilateral polygonal cross-section shape, allowing to efficiently transfer the concentrated radiation via corresponding equilateral openings, 85t and 85p, of the radiation guiding structure 85. This configuration further simplifies the interfacing between the equilateral output opening 85p of the radiation guiding structure 85 and a radiation guiding element having a circular cross-section shape (not shown), as ordinarily used in solar applications, and minimize radiation losses associated therewith. For improved efficiency, the internal light/ radiation reflecting faces of the radiation guiding structure 85 also has a substantially corresponding equilateral polygonal cross-sectional shape tapering from the large-tilted opening 85t towards the small-horizontal opening 85p.

In this specific and non-limiting example four elongated radiation collectors, 81 82 83 and 84, are arranged side by side in parallel to form a substantially square radiation receiving front 88 to efficiently concentrate and transfer collected radiation to the radiation guiding structure 85 having substantially square openings, 85t and 85p, and a substantially square cross-sectional shape formed by its internal reflecting faces. it is noted that the radiation collectors, 81 82 83 and 84, can be implemented by any one of the CPC devices disclosed herein or known in the art.

Figure 12B:
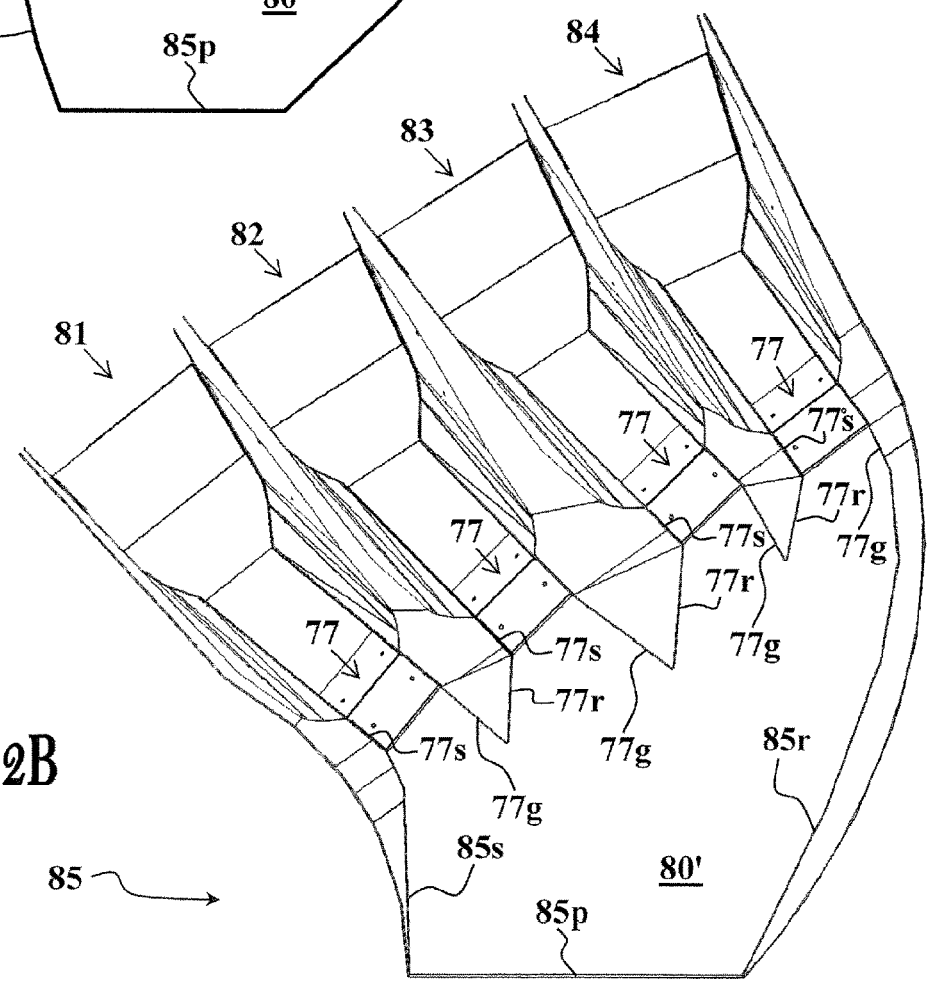
Figure 12C:
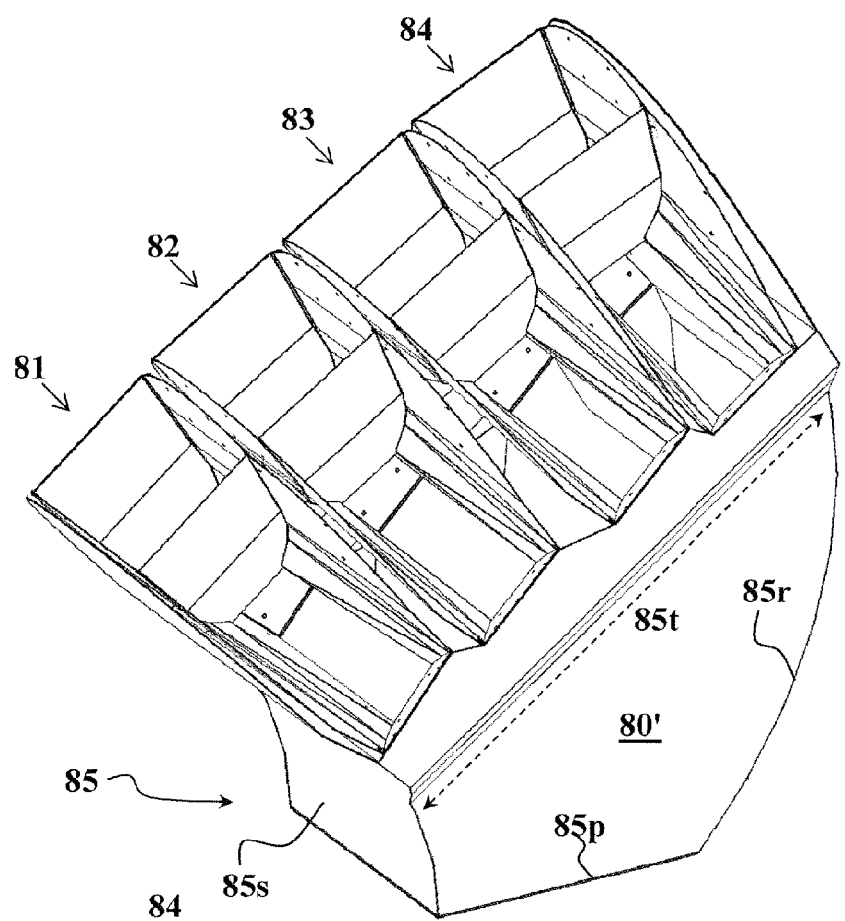
Figure 12D:
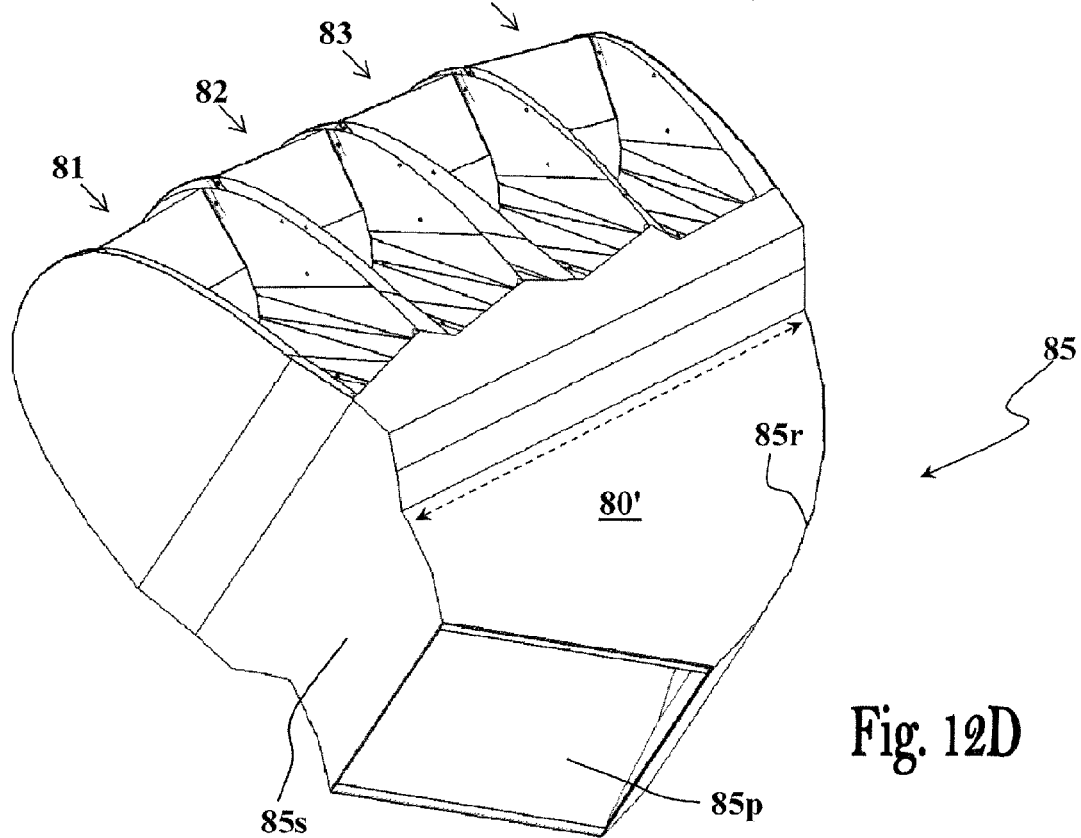

Optionally, and in some embodiments preferably the radiation collectors, 81 82 83 and 84, are implemented by any one of the radiation collection apparatuses described in international patent application No. PCT/IL2017/050024, of the same applicant hereof, the disclosure of which is incorporated herein by reference. FIGS. 12B, 12C and 12D, respectively show side sectional, top and bottom perspective views, of a radiation collector assembly 80' implemented using a specific radiation collector apparatus (20) having additional internal reflecting surfaces.

The modified CPC/radiation collector designs disclosed herein can be used in a great variety of solar applications, such as, but not limited to, passive and active solar heating, space heating and hot water production, heat pumps and sorption cooling, air conditioning, and refrigeration systems, industrial air and water systems for process heat, desalination, and solar chemical systems for thermal power systems.

As described hereinabove and shown in the associated figures, embodiments of the present invention provides modified CPC/radiation collector designs optimized for substantially uniform radiation collection at the price of slightly enlarged device dimensions and somewhat reduced flux collection. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A non-imaging radiation collecting and concentrating device comprising: an entrance aperture for receiving incoming radiation, an exit aperture located opposite to said entrance aperture for outputting concentrated radiation, and one or more concaved reflectors arranged between said entrance and exit apertures, said one or more concaved reflectors defining an acceptance angle of the device relative to an optical axis thereof and configured such that optical focuses thereof are located between an edge of said exit aperture and said optical axis, thereby substantially preventing escape of the incoming radiation received in the entrance aperture within said acceptance angle and providing substantial uniform radiation collection at the exit aperture of the device; wherein a distance between the optical focus of each of the one or more concaved reflectors and an edge of the exit aperture is such that the radiation concentrated by said one or more concave reflectors is focused to the exit aperture without hitting another concaved reflector of the device; wherein the distance between the optical focus of each of the one or more concaved reflectors and the opposite edge of the exit aperture is about 0.05 to 0.27 of a dimension of the exit aperture.

2. A method of constructing the radiation collector according to claim 1, the method comprising:
providing one or more concaved reflectors, each of the one or more concaved reflectors configured to reflect and concentrate incident radiation onto a focal region thereof; and
arranging said one or more concaved reflectors to define the entrance aperture for receiving the incident radiation, the exit aperture for outputting the radiation reflected and concentrated by said one or more concaved reflectors, and the optical axis extending along centers of said apertures, such that the focal region of each of the one or more concaved reflectors is obtained between the edge of the exit aperture and the optical axis.

3. The method of claim 2, further comprising configuring the one or more concaved reflectors for locating the focal regions thereof at a distance from an edge of the exit aperture such that the radiation concentrated by said one or more concaved reflectors is focused to the exit aperture without hitting another concaved reflector of the device.

4. The method of claim 3 wherein configuring the one or more concaved reflectors comprises adjusting a concave depth of the at least some of the reflectors.

5. The method of claim 3 wherein the one or more concaved reflectors are parabolic reflectors and wherein configuring of the one or more concaved reflectors comprises adjusting at least one of a parabolic focus, parabolic directrix, or parabolic vertex, of said parabolic reflectors.

6. The method of claim 2, further comprising using the radiation collector to collect solar radiation.

7. The method of claim 6, further comprising configuring at least some of the one or more concaved reflectors to define acceptance angle of the device of about 20° to 30°.

8. The method of claim 6, further comprising configuring at least some of the one or more concaved reflectors to obtain a concentration ratio of about 2 to 3.

9. The method of claim 2, further comprising adjusting heights of at least some of the one or more concaved reflectors to set a dimension of the entrance aperture.

10. The non-imaging radiation collecting and concentrating device of claim 1 wherein the incoming radiation is received from a solar radiation source.

11. The non-imaging radiation collecting and concentrating device of claim 10 wherein the acceptance angle of the device is about 20° to 30°.

12. The non-imaging radiation collecting and concentrating device of claim 10 wherein concentration ratio of the device is in the range of 2 to 3.

13. The non-imaging radiation collecting and concentrating device of claim 1 wherein the one or more concaved reflectors comprises two concaved reflectors symmetrically positioned one in front of the other.

14. A radiation collecting and concentrating device having a polygon funnel-shaped structure constructed by intersection of two or more of the non-imaging radiation collecting and concentrating devices of claim 13.

15. The non-imaging radiation collecting and concentrating device of claim 1 wherein the one or more concaved reflectors are configured such that the optical focus of each of the one or more concaved reflectors is located either within a region defined by the exit aperture, or above or below the exit aperture.

16. The non-imaging radiation collecting and concentrating device of claim 1, wherein the distance between the optical focus of each of the one or more concaved reflectors and the opposite edge of the exit aperture is about two tenths of a dimension of the exit aperture.

17. The non-imaging radiation collecting and concentrating device of claim 1 wherein a height of the non-imaging radiation collecting and concentrating device is adjusted to set dimension of the entrance aperture.

18. The radiation collecting and concentrating device of claim 1 wherein the one or more concaved reflectors are constructed as a surface revolution of a concaved curve about the optical axis of the device.

19. A lighting system, comprising an array of radiation collectors arranged for collection of radiation of a celestial radiation source throughout a predefined trajectory thereof, said array of radiation collectors comprising one or more of the non-imaging radiation collecting and concentrating devices according to claim 1.

20. A collector assembly, comprising:

an array of the radiation collector according to claim 1, said array of radiation collectors configured to form an equilateral radiation collection front for efficiently transferring concentrated light outputted from said array of radiation collectors towards a corresponding equilateral output opening.

21. A method of modifying a non-imaging radiation collecting and concentrating device having one or more concaved radiation reflecting elements arrange about an optical axis of the device to define entrance and exit apertures thereof, the method comprising: adjusting a concave depth of the one or more radiation reflecting elements such that optical focuses thereof are shifted a predefined distance from edges of the exit aperture towards the optical axis of the non-imaging radiation collecting and concentrating device, to thereby prevent escape of incoming radiation received at the entrance aperture and provide a substantial uniform radiation collection profile; wherein a distance between the optical focus of each of the one or more concaved radiation reflecting elements and the edge of the exit aperture is such that the radiation concentrated by said one or more concave reflectors is focused to the exit aperture without hitting another concaved reflector of the device; wherein the distance between the optical focus of each of the one or more concaved reflectors and the opposite edge of the exit aperture is about 0.05 to 0.27 of a dimension of the exit aperture.

* * * * *